United States Patent
Arbaugh et al.

(10) Patent No.: US 6,185,678 B1
(45) Date of Patent: Feb. 6, 2001

(54) SECURE AND RELIABLE BOOTSTRAP ARCHITECTURE

(75) Inventors: William A. Arbaugh, Ellicott City, MD (US); David J. Farber, Landenberg; Angelos D. Keromytis, Philadelphia, both of PA (US); Jonathan M. Smith, Princeton, NJ (US)

(73) Assignee: Trustees of the University of Pennsylvania, Philadelphia, PA (US)

( * ) Notice: Under 35 U.S.C. 154(b), the term of this patent shall be extended for 0 days.

(21) Appl. No.: 09/165,316

(22) Filed: Oct. 2, 1998

Related U.S. Application Data

(60) Provisional application No. 60/060,885, filed on Oct. 2, 1997.

(51) Int. Cl.[7] ............................... G06F 9/00; G06F 11/30
(52) U.S. Cl. ............................................. 713/2; 713/200
(58) Field of Search ................................... 713/1, 2, 100, 713/200, 201

(56) References Cited

U.S. PATENT DOCUMENTS

| | | | |
|---|---|---|---|
| 4,200,770 | 4/1980 | Hellman et al. . | |
| 5,146,499 | * 9/1992 | Geffrotin | 380/23 |
| 5,379,342 | 1/1995 | Arnold . | |
| 5,410,699 | * 4/1995 | Bealkowski et al. | 713/2 |
| 5,421,006 | 5/1995 | Jablon . | |
| 5,564,054 | * 10/1996 | Bramnick et al. | 713/2 |
| 5,629,980 | * 5/1997 | Stefik et al. | 380/4 |
| 5,692,047 | * 11/1997 | McManis | 380/4 |
| 5,745,669 | * 4/1998 | Hugard et al. | 714/3 |
| 5,937,063 | * 8/1999 | Davis | 380/4 |
| 5,974,546 | * 10/1999 | Anderson | 713/2 |

OTHER PUBLICATIONS

J. Tygar & B. Yee, *Dyad: A System for Using Physically Secure Coprocessors*, Technical Report CMU–CS–91–140R, Carnegie Mellon University, May 1991.

B. Yee, *Using Secure Coprocessors*, Ph.D. Thesis, Carnegie Mellon University, May, 1994.

P. C. Clark, *BITS: A Smartcard Protected Operating System*, Ph.D. Thesis, George Washington University, May 8, 1994.

B. Lampson et al., *Authentication in Distibuted Systems: Theory and Practice*, ACM Transactions on Computer Systems, v10:265–310, Nov. 1992.

(List continued on next page.)

*Primary Examiner*—Dennis M. Butler
(74) *Attorney, Agent, or Firm*—Sterne, Kessler, Goldstein & Fox PLLC

(57) ABSTRACT

Integrity is rarely a valid presupposition in many systems architectures, yet it is necessary to make any security guarantees. To address this problem, the present invention discloses a secure bootstrap process, which presumes a minimal amount of integrity. The basic principle is sequencing the bootstrap process as a chain of progressively higher levels of abstraction, and requiring each layer to check a digital signature of the next layer before control is passed to it. A major design decision is the consequence of a failed integrity check. A simplistic strategy is to simply halt the bootstrap process. However, the bootstrap process of the present invention can be augmented with automated recovery procedures which preserve the security properties of the bootstrap process of the present invention under the additional assumption of the availability of a trusted repository. A variety of means by which such a repository can be implemented are disclosed with attention focused on a network-accessible repository. The recovery process is easily generalized to applications other than the bootstrap process of the present invention, such as standardized desktop management and secure automated recovery of network elements such as routers or "Active Network" elements.

7 Claims, 12 Drawing Sheets

OTHER PUBLICATIONS

R. Droms, *Authentication for DHCP Messages*, expired RFC draft, Nov. 1998.

D. Eastlake & C. Kaufman, *Domain Name System Security Extensions*, Internet RFC 2065, Jan. 1997.

W. Diffie et al., *Authentication and Authenticated Key Exchanges*, Codes and Cryptography, 2:107–125, 1992.

*Digital Signature Standards*, Technical Report FIPS–186, U.S. Department of Commerce, May 1994.

*Secure Hash Standard*, Technical Report FIPS–180–1, U.S. Department of Commerce, Apr. 1995.

*HMAC: Keyed–Hashing for Message Authentication*, Internet RFC 2104, Feb. 1997.

*Dynamic Host Configuration Protocol*, Internet RFC 2131, Mar. 1997.

*DHCP Options and BOOTP Vendor Extensions*, Internet RFC 2132, Mar. 1997.

J Reynolds & J Postel, *Assigned Numbers*, Internet RFC 1700, Oct. 1994.

K. R. Sollins, *The TFTP Protocol (revision 2)*, Internet RFC 1350. Jul. 1992.

G. Malkin & A. Harkin, *TFTP Option Extension*, Internet RFC 1782, Mar. 1995.

\* cited by examiner

SECURE AND RELIABLE BOOTSTRAP ARCHITECTURE

CROSS-REFERENCE TO RELATED APPLICATION

This application claims the benefit of earlier filed U.S. provisional patent application Ser. No. 60/060,885 filed Oct. 2, 1997.

STATEMENT AS TO RIGHTS TO INVENTIONS MADE UNDER FEDERALLY-SPONSORED RESEARCH AND DEVELOPMENT

This invention was made with U.S. Government support under contracts #DABT63-95-C-0073, #N66001-96-C-852, and #MDA972-95-1-0013 awarded by the Advanced Research Project Agency. The U.S. Government has certain rights in the invention.

BACKGROUND OF THE INVENTION

1. Field of the Invention

This invention relates to an architecture for initializing a computer system and more particularly to a secure bootstrap process and automated recovery procedure.

2. Related Art

Systems are organized as layers to limit complexity. A common layering principle is the use of layers of abstraction to mark layer boundaries. A computer system is organized in a series of levels of abstraction, each of which defines a "virtual machine" upon which higher levels of abstraction are constructed. Each virtual machine presumes the correctness (integrity) of whatever virtual or real machines underlie its own operation. Under the presumption that the hardware comprising the machine (the lowest layer) is valid, integrity of a layer can be guaranteed if and only if: (1) the integrity of the lower layers is checked, and (2) transitions to higher layers occur only after integrity checks on them are complete. The resulting integrity "chain" inductively guarantees system integrity. When these suppositions are true, the system is said to possess integrity. When these conditions are not met, as they typically are not in the bootstrapping (initialization) of a computer system, no integrity guarantees can be made. Yet, these guarantees are increasingly important to diverse applications such as Internet commerce, security systems, and "active networks." However, it is surprising, given the great attention paid to operating system security today, that so little attention has been paid to the underpinnings required for secure operation, e.g., a secure bootstrapping phase for these operating systems. Without such a secure bootstrap the operating system kernel cannot be trusted since it is invoked by an untrusted process. Designers of trusted systems often avoid this problem by including the boot components (including but not limited to the ROM BIOS (Basic Input Output System), any expansion card ROMs, CMOS memory and NVRAM, the boot sector and the operating system kernel) in the trusted computing base (TCB). That is, the bootstrap steps are explicitly trusted. However, the present invention discloses that this provides a false sense of security to the users of the operating system, and more importantly, is unnecessary.

A number of attempts were made in the 1960s and 1970s to produce secure computing systems, using a secure operating system environment as a basis. However, an essential and unnecessary presumption of the security arguments for these designs was that system layers underpinning the operating system, whether hardware, firmware, or both, are trusted. The first presentation of a secure boot process was done by Yee in *Dyad: A system for using physically secure coprocessors,* by J. Tygar and B. Yee, Technical Report CMU-CS-91 -140R, Carnegie Mellon University, May 1991. In Yee's model, a cryptographic coprocessor is the first to gain control of the system. Unfortunately, this is not possible without a complete architectural revision of most computer systems—even if the coprocessor is tightly coupled. Yee expanded his discussion of a secure boot in his thesis, see B. Yee, *Using Secure Coprocessors,* Ph.D. thesis, Carnegie Mellon University, 1994, but he continues to state that the secure coprocessor should control the boot process verifying each component prior to its use. Yee states that boot ROM modifications may be required, but since a prototype secure boot process was never implemented, more implementation questions are raised than answered by his discussion.

P.C. Clark presents, in *BITS: A Smartcard Protected Operating System,* Ph.D. thesis, George Washington University, 1994, a secure boot process for DOS that stores all of the operating system bootstrap code on a PCMCIA card. He does not address the verification of any firmware (system BIOS or expansion cards). Clark's model, however, does permit mutual cryptographic authentication between the user and the host which is an important capability. However, the use of the PCMCIA card containing all of the system boot files creates several configuration management problems, e.g., a system upgrade requires the reprogramming of all the cards in circulation, and since today many users have multiple operating systems on their personal computers a user needs a separate PCMCIA card for each operating system they wish to use.

B. Lampson, M Abadi, and M. Burrows also describe a secure boot model, in *Authentication in distributed systems: Theory and Practice,* ACM Transactions on Computer Systems, v10:265–310, November 1992, as an example for their authentication calculus. In the Lampson et al. model, the entire boot ROM is trusted, and they do not address the verification of expansion cards/ROMs. The Birlix Security Architecture, disclosed in *The Birlix security architecture,* by H. Härtig, O. Kowalski and W Kühnhauser, Journal of Computer Security, 2(1):5–21, 1993, proposes a model designed by Michael Gross that is similar to the Lampson et al. model. As a result, the Birlix model also suffers from the same problems. In both cases, the boot ROM is responsible for generating a public and private key pair for use in host based authentication once the operating system is running. The present invention, on the other hand, leaves any security related functions, beyond the boot process, to the operating system without loss of security. To do otherwise limits security choices for the operating system.

Two patents, U.S. Pat. No. 5,379,342 to Arnold ("the Arnold patent") and U.S. Pat. No. 5,421,006 to Jablon ("the Jablon patent") also present secure boot models. Both of these patents are similar in that the BIOS verifies the boot block before control is transferred and the boot block verifies the OS kernel before control is transferred. The Jablon patent continues to provide static integrity checks while the operating system is running, i.e validating the integrity of a program before execution. Another difference between the two patents is that the Arnold patent uses a Modification Detection Code, e.g. MD5, and Jablon uses public key cryptography. Both approaches, however, fail to verify the BIOS beyond the normal eight bit additive CRC, and both approaches also fail to verify expansion ROMs. The ROMs on add in boards are programs, and they are run during the boot process' of these two patents without verification. Therefore, Jablon's and Arnold's approaches fail to provide a secure bootstrap process since neither approach verifies the BIOS and the ROMs.

Several anti-virus products also claim to create a secure boot process. A number of companies and BIOS vendors have anti-virus capabilities in their products. All concern themselves with the boot block only. Those products that run as an application over the operating system typically store a MDC for the boot block and check it when run. This detects changes to the boot block, but is susceptible to spoofing. The BIOS anti-virus protection simply alerts the user when a process is attempting to write to the boot block. The protection is ineffective when a protected mode operating system is running and a real mode application writes directly to the storage device. Finally, several vendors are now offering ROM based anti-virus protection. These products work by using an expansion ROM board that is executed during the boot process. The code on the ROM board checks the boot block against a previously stored MDC in order to detect changes. The vendors claim this prevents the possibility of spoofing the check as is possible when the check is done by an application. This is not entirely true, since the BIOS passes control to the ROM and if the BIOS has been reprogrammed to skip the ROM, control will never be passed to the ROM.

When a system detects an integrity failure, one of three possible courses of action can be taken. The first is to continue normally, but issue a warning. Unfortunately, this may result in the execution of either a corrupt or malicious component. The second is to not use or execute the component. This approach is typically called fail secure, and creates a potential denial of service attack. The final approach is to recover and correct the inconsistency from a trusted repository before the use or execution of the component. The first two approaches are unacceptable when the systems are important network elements such as switches, intrusion detection monitors, or associated with electronic commerce, since they either make the component unavailable for service, or its results untrustworthy.

None of the approaches mentioned above address a recovery process in the event of integrity failure or the secure recovery of bootstrap components. Previous efforts to provide recovery of bootstrap components have required human interaction, typically to insert a floppy disk containing the new component or to boot from a floppy disk. There are several reasons why this recovery method is inferior to the present invention. The first is that providing physical security for the floppy disk is extremely difficult. Users can take the disks wherever they like, and do whatever they like to them. The major shortcoming, however, in only using a boot disk is that none of the firmware is verified prior to use. Thus, a user can add or replace expansion boards into the system without any security controls, potentially introducing unauthorized expansion cards. Additionally, these efforts have only focused on repairing a single component of the entire process, i.e. only repairing the boot block, or the BIOS but not both. This is in contrast to the present invention which provides automatic recovery of all of the bootstrap components including ROM chips.

Finally, there have been several efforts at incorporating authentication into DHCP as is done in the AEGIS embodiment of the recovery process of the present invention. The first effort, disclosed in the expired RFC draft *Authentication for DHCP messages,* by R. Droms, November 1996, involves the use of a shared secret between the DHCP client and server. While this approach is secure, it severely limits the mobility of clients to those domains where a shared secret was previously established. Furthermore, the maintenance and protection of the shared secrets is a difficult process. Another effort at incorporating authentication into DHCP was by TIS. This proposal combines DHCP with DNSSEC, see D. Eastlake and C. Kaufman, *Dynamic Name Service and Security,* Internet RFC 2065, January 1997. This approach provides for the mobility of DHCP clients, but at a significant increase in cost in terms of complexity. The client implementation, in order to support this approach, must also include an implementation of DNSSEC. This will significantly increase the size of client code, possibly beyond the ROM size available to the client. Recently, Intel has proposed authentication support for DHCP, see Baiju V. Patel, *Securing DHCP,* Work in Progress, July 1997. Their proposal uses a two phase approach. In the first phase, the computer system boots normally using DHCP. The second phase begins after the system completes the DHCP process and uses ISAKMP to exchange a security association. This security association is then used to once again obtain the configuration information from the DHCP server using a secure channel, if such a channel can be established. This information is then compared to that obtained in the first phase. If they differ or a secure channel cannot be established, then the boot fails. The benefit of this approach is that it requires no changes to DHCP. The drawbacks are the same as the DNSSEC approach, discussed above, with the addition of two problems. The first is a possible race condition vulnerability during the time before the two configurations are compared. The second is that the approach does not protect against denial of service attacks.

SUMMARY OF THE INVENTION

The present invention discloses an architecture for initializing a computer system that ensures the integrity of the bootstrap process and provides reliability. Integrity is validated at each layer transition in the bootstrap process and a recovery process is included for integrity check failures. Ensuring the integrity is provided by the use of public key cryptography, a cryptographic hash function, and public key certificates. The present invention does this by constructing a chain of integrity checks, beginning at power-on and continuing until the final transfer of control from the bootstrap components to the operating system itself The integrity checks compare a computed cryptographic hash value with a stored digital signature associated with each component. Ensuring the integrity could also be done with the use of a modification detection code (MDC) with an increase in performance and a loss of security. Once an integrity failure is detected, the invention uses a secure protocol to inform a trusted repository that a failure has occurred and to obtain a valid replacement component. The secure protocol of the present invention can be based on well known networking protocols, such as DHCP (Dynamic Host Configuration Protocol) and TFTP (Trivial File Transfer Protocol), or on a custom protocol or various combinations of known protocols. Cryptographic algorithms are combined with the chosen protocols to add security to the recovery process, however if security is not a concern, then a less robust approach could be used.

The present invention can also be utilized to reduce the Total Cost of Ownership (TCO) of a personal computer, through automatically detecting and repairing integrity failures, thereby permitting the user to continue to work without the nuisance of a trouble call to support staff and the associated down time. A log can be created by the trusted repository of the present invention which can be monitored by a system administrator to identify workstations that require "hands on" repairs, e.g. ROM failure, enabling the system administrator to schedule the work to be done when the user is not using the computer. The present invention also enables the bootstrap components to be automatically updated. One way this can be done is to limit the validity period of the cryptographic certificates associated with each component of the bootstrap process. When the certificate expires, the trusted repository of the present invention is contacted and either a new certificate is obtained, in the case where the component does not need an update, or a new component and certificate are obtained, in the case where a newer version of the component is available. This permits the system administrator to update all of the workstations from a central location without having to visit each individual computer system. A second approach is to add a hook to the BIOS to contact the trusted repository at the beginning of the bootstrap process of the present invention. The purpose of this contact is two fold. First, it permits a status monitoring of each workstation. Second, the contact allows centralized updates to be done in the following manner. When the server receives the "I am booting" message from the client, the server would check a database containing the configuration of the client. The Server would then compare that configuration with the current configuration desired for the client. If they are different, then the server would instruct the client to download the appropriate changes.

An alternate approach to provide a Secure and Reliable Bootstrap is to modify the above embodiments by moving the expansion ROM detection and verification routines into the operating system. The expansion ROMs can then be detected and verified by the operating system driver interface rather than the BIOS.

DETAILED DESCRIPTION OF THE PREFERRED EMBODIMENTS

The present invention is an architecture for initializing a computer system. AEGIS, an embodiment of the present invention is described below. AEGIS increases the security of the boot process by ensuring the integrity of bootstrap code. It does this by constructing a chain of integrity checks, beginning at power-on and continuing until the final transfer of control from the bootstrap components to the operating system itself. The integrity checks compare a computed cryptographic hash value with a stored digital signature associated with each component. This is accomplished through modifications and additions to the BIOS. The AEGIS architecture also includes a recovery mechanism for repairing integrity failures which protects against some classes of denial of service and modifications to components. In the AEGIS boot process, either the operating system kernel is started, or a recovery process is entered to repair any integrity failure detected. Once the repair is completed, the system is restarted to ensure that the system boots. This entire process occurs without user intervention.

In AEGIS, the boot process is guaranteed to end up in a secure state, even in the event of integrity failures outside of a minimal section of trusted code. A guaranteed secure boot process is defined in two parts. The first is that no code is executed unless it is either explicitly trusted or its integrity is verified prior to its use. The second is that when an integrity failure is detected the recovery process can recover a suitable verified replacement module. An added benefit of the recovery mechanism is the potential for reducing the Total Cost of Ownership (TCO) of a computer system by reducing trouble calls and down time associated with failures of the boot process.

Figure 1A:
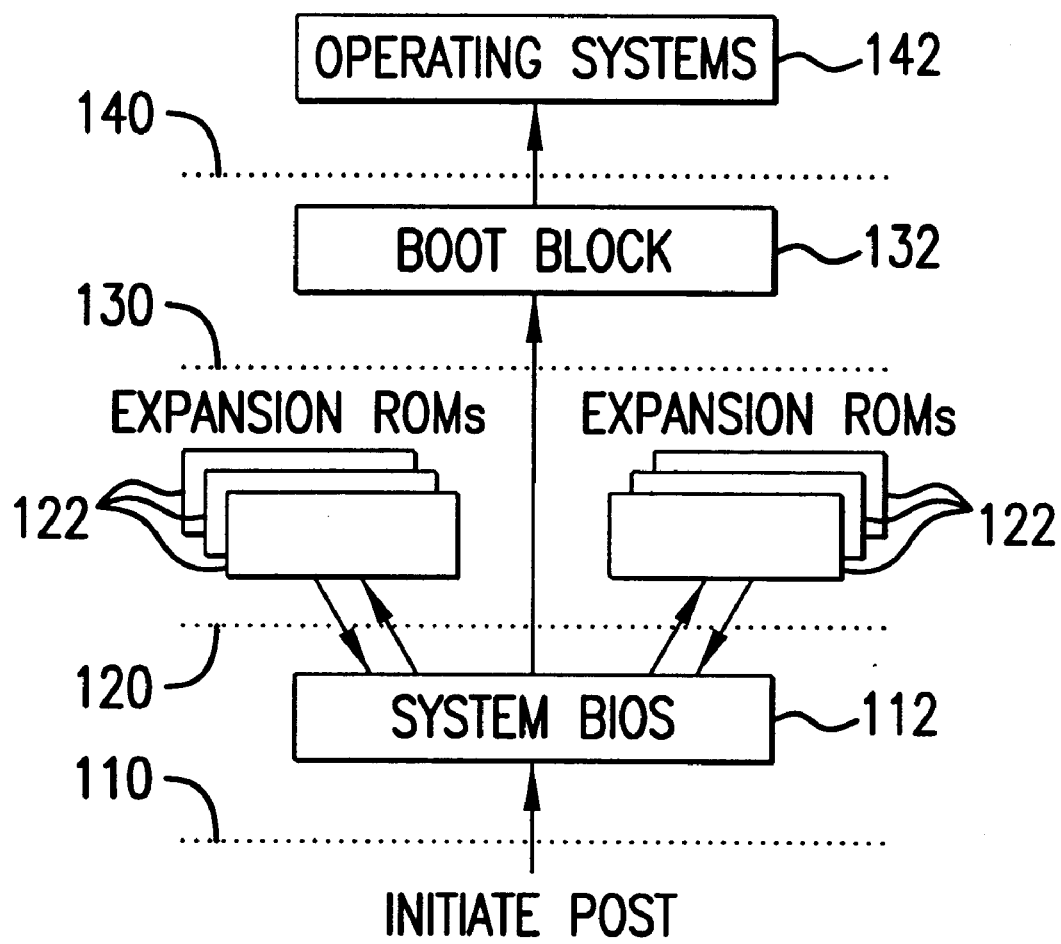
FIG. 1a is a functional diagram of the functional layers of the typical IBM PC bootstrap process.
Figure 1B:
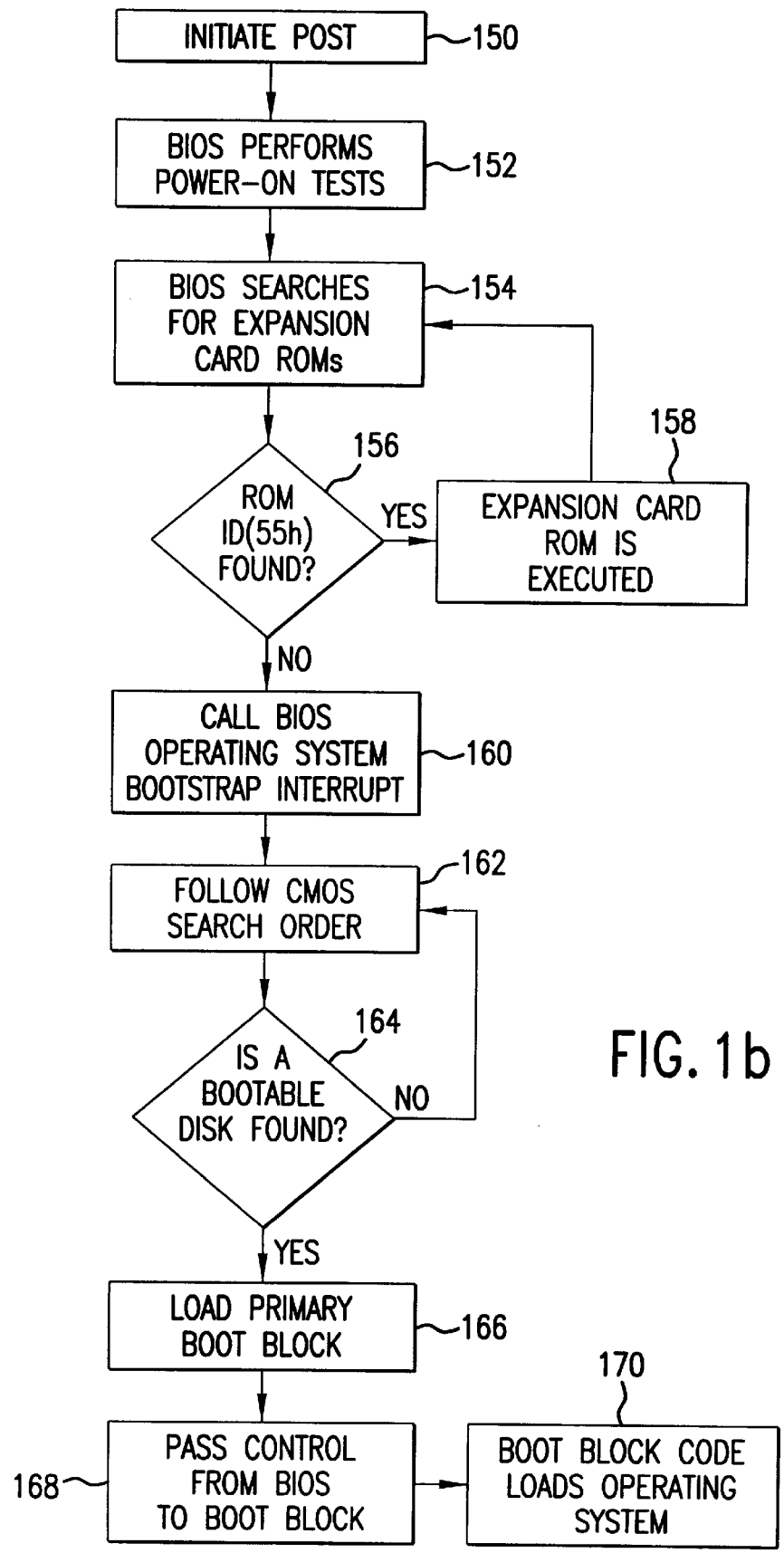
FIG. 1b is a flow chart showing the flow of the typical IBM PC bootstrap process.
Figure 1C:
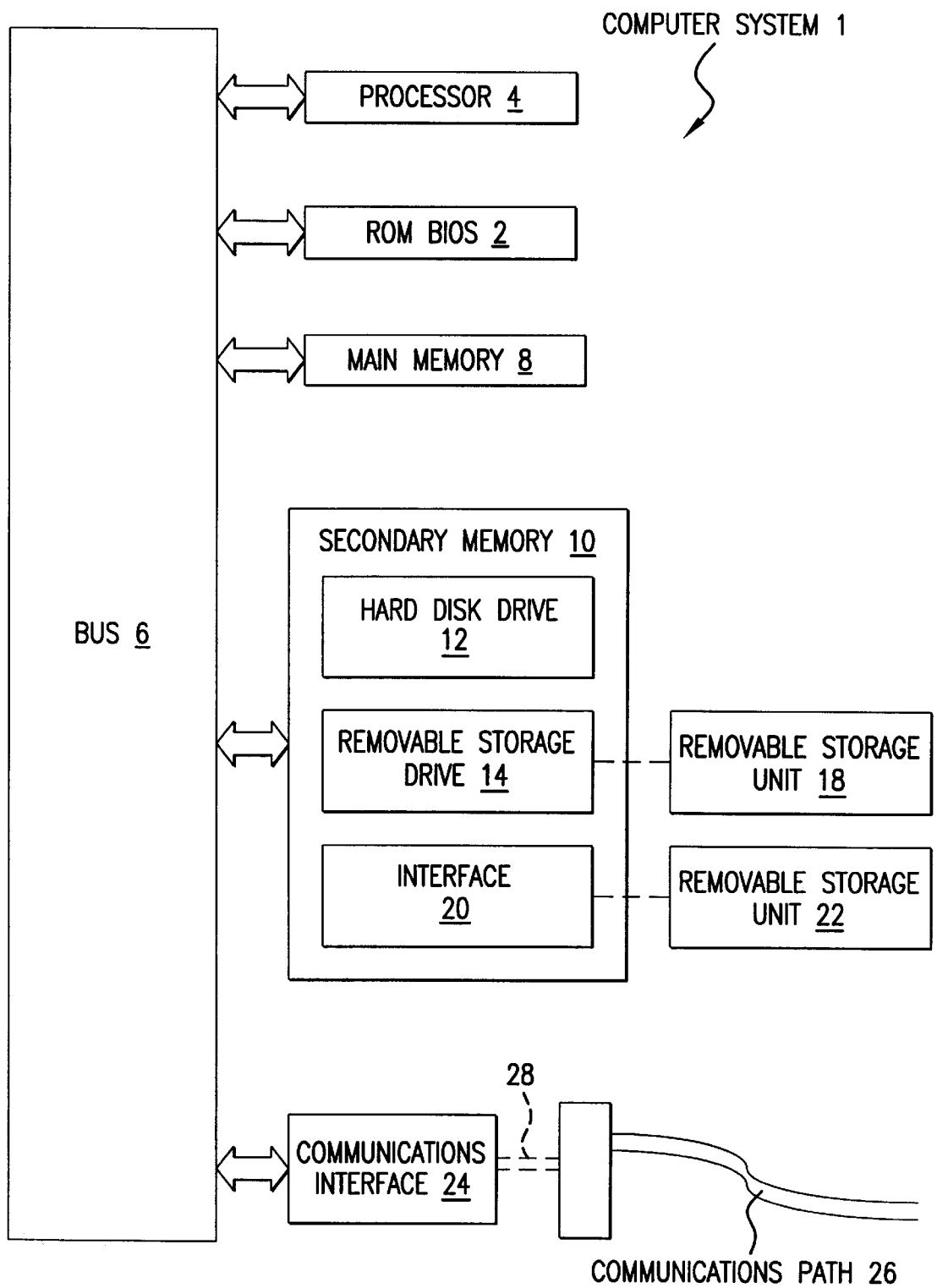
FIG. 1c is structural diagram of a typical IBM PC architecture.

From the start, AEGIS has been targeted for commercial operating systems on commodity hardware, making it a practical "real-world" system. To have a practical impact, AEGIS must be able to work with commodity hardware with minimal changes (ideally none) to the existing architecture. In the embodiment discussed below, the IBM PC architecture is selected as the platform because of its large user community and the availability of the source code for several operating systems. FIG. 1(c) is a structural diagram of the typical IBM PC architecture. The computer system 1 includes one or more processors 4. Processor 4 is connected to a expansion bus 6. Computer system 1 also includes a main memory 8, preferably random access memory (RAM) and a ROM BIOS 2, which stores the system BIOS. Computer system may also include a secondary memory 10. Secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well known manner. Removable storage unit 18, represents a floppy disk, magnetic tape, optical disk, etc. which is read by and written to by removable storage drive 14. As will be appreciated, the removable storage unit 18 includes a computer usable storage medium having stored therein computer software and/or data.

Secondary memory 10 may also include other similar means for allowing computer programs or other instructions to be loaded into computer system 1. Such means may include, for example, a removable storage unit 22 and an interface 20. Examples of such may include a removable memory chip (such as an EPROM or PROM) and associated socket, and other removable storage units 22 and interfaces 20 which allow software and data to be transferred from the removable storage unit 22 to computer system 1.

Computer system 1 also includes a communications interface 24. Communications interface 24 allows software and data to be transferred between computer system 1 and external devices. Examples of communications interface 24 may include a modem, a network interface (such as an Ethernet card), a communications port, a PCMCIA slot and card, etc. Software and data transferred via communications interface 24 are in the form of signals 28 which may be electronic, electromagnetic, optical or other signals capable of being received by communications interface 24. These signals 28 are provided to communications interface 24 via a communications path (i.e., channel) 26. This communication path 26 carries signals 28 and may be implemented using wire or cable, fiber optics, a phone line, a cellular phone link, an RF link and other communications paths.

The FreeBSD operating system is also used, but the AEGIS architecture is not limited to any specific operating system. Porting to a new operating system only requires a few minor changes to the boot block code so that the kernel can be verified prior to passing control to it. Since the verification code is contained in the BIOS, the changes will not substantially increase the size of the boot loader, or boot block.

I. Assumptions

The AEGIS model relies explicitly on three assumptions.

The first assumption is that the motherboard, processor, and a portion of the system ROM (BIOS) are not compromised, i.e. the adversary is unable or unwilling to replace the motherboard or BIOS. This assumption can be reduced by using a flash ROM such as the Intel 28F001BX-B which has an 8KB block that can be protected from reprogramming while the remainder of the ROM can be reprogrammed. Placing the bare essentials needed for integrity verification and recovery in this 8KB block provides a significant level of protection. The AEGIS model also depends on the integrity of a ROM expansion card which contains code for recovering components from a trusted network host. An alternative and less costly approach is to use the PROM available on most network cards in lieu of the additional expansion card.

The second assumption is the existence of a cryptographic certificate authority infrastructure to bind an identity with a public key, although no limits are placed on the type of infrastructure. An example of such an infrastructure is the infrastructure being established by Microsoft and Verisign for use with Authenticode.

The final assumption is that a trusted repository exists for recovery purposes. This repository may be a host on a network that is reachable through a secure communications protocol, or it may be a trusted ROM card located on the protected host.

II. AEGIS Boot Process

Every computer with the IBM PC architecture follows approximately the same boot process. This process can be divided into four functional layers, 110, 120, 130,140, as is done in FIG. 1a, which correspond to phases of the bootstrap process, shown in FIG. 1b.

First layer 110 includes system BIOS 112 and corresponds to the first phase of the bootstrap process. The first phase of the boot process is the Power on Self Test or POST. POST is invoked, step 150, in one of four ways:

1. Applying power to the computer automatically invokes POST causing the processor to jump to the entry point indicated by the processor reset vector.

2. Hardware reset also cause the processor to jump to the entry point indicated by the processor reset vector.

3. Warm boot (ctrl-alt-del under DOS) invokes POST without testing or initializing the upper 64K of system memory.

4. Software programs, if permitted by the operating system, can jump to the processor reset vector.

In each of the cases above, a sequence of tests are conducted, step 152.

All of these tests, except for the initial processor self test, are under the control of system BIOS 112.

Once system BIOS 112 has performed all of its power on tests, it begins searching a well known memory range for expansion card ROMs 122, step 154, which are identified in memory by a specific signature, such as the ROMs for the video card, the hard disk card and other devices. Once a valid signature is found by system BIOS 112, step 156, control is immediately passed to the corresponding expansion card ROM 122. When the built in BIOS program on each expansion card ROM 122 completes its execution, step 158, control is returned to system BIOS 112 and the search is continued for additional expansion card ROMs, step 154.

The final step of the POST process calls the BIOS operating system bootstrap interrupt (Int 19h), step 160. The bootstrap code first finds a bootable disk by searching the disk search order defined in the CMOS memory, step 162. Once a bootable disk is found, step 164, the bootstrap code loads primary boot sector 132 into memory, step 166, and passes control to it, step 168. The code contained in boot sector 132 proceeds to load operating system 142, step 170, or a secondary boot sector (not shown).

Ideally, the boot process would proceed in a series of levels with each level passing control to the next until the operating system kernel is running. Unfortunately, the IBM architecture uses a "star like" model, as shown in FIG. 1a, where control is passed to and from system BIOS 112 until finally passed on to boot sector 132.

A. AEGIS BIOS Modifications

Figure 2A:
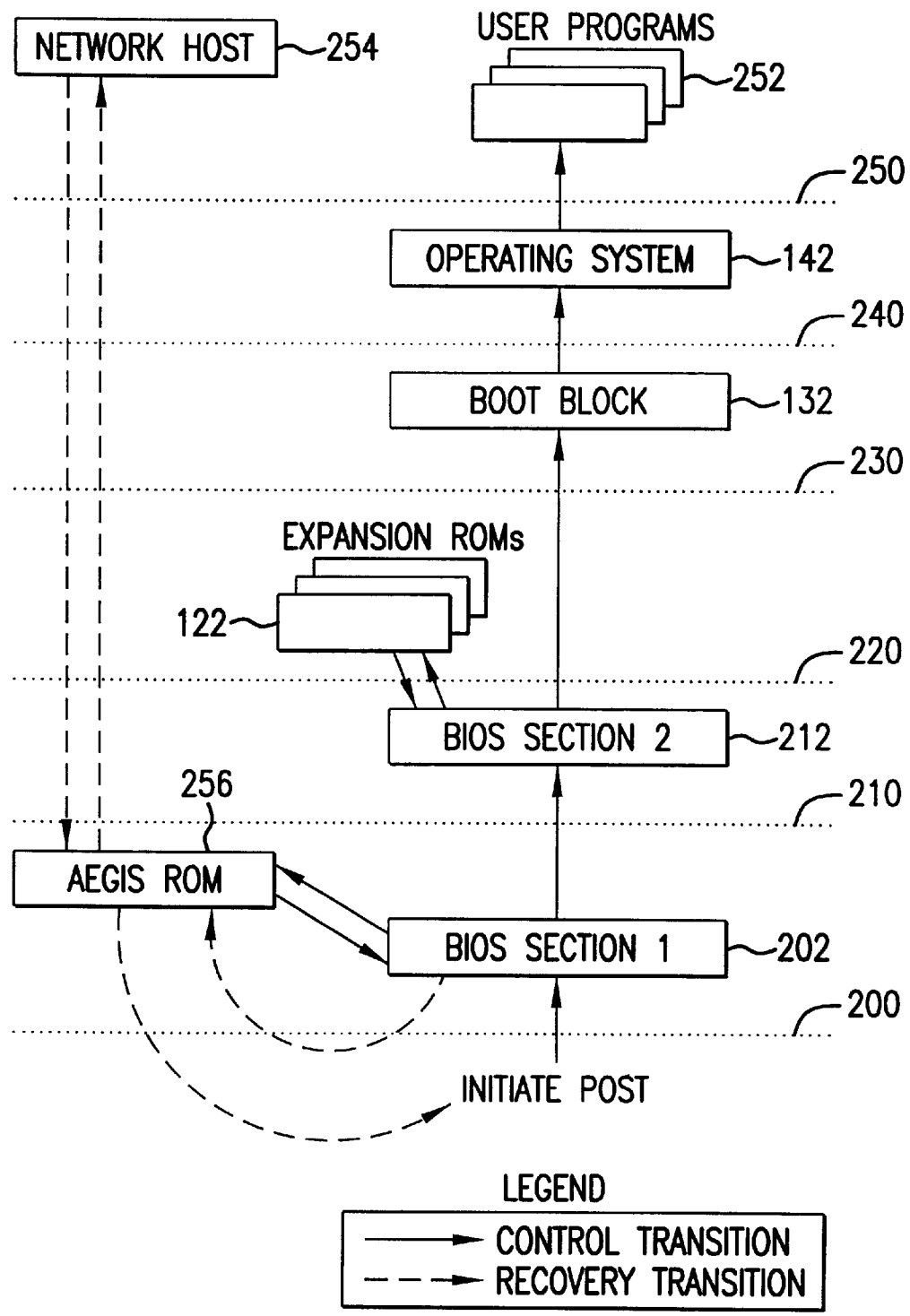
FIG. 2a is a functional diagram of the functional layers of the AEGIS embodiment of the bootstrap process of the current invention.

FIG. 2a shows the AEGIS BIOS modifications. In FIG. 2a, the boot process has again been divided up into several functional layers, 200, 210, 220, 230, 240, 250, to simplify and organize the following discussion of the AEGIS BIOS modifications. Each increasing layer adds functionality to the system, providing correspondingly higher levels of abstraction. The lowest layer, first layer 200 contains the small section of trusted software, digital signatures, public key certificates, and recovery code AEGIS relies on throughout the boot process. The integrity of layer 200 is assumed to be valid. However, after initiating POST, step 260, an initial checksum test is performed, step 262, to identify PROM failures. Second layer 210 contains the remainder of the usual system BIOS code, and the CMOS memory. Third layer 220 contains all of the expansion cards, if any, and their associated expansion card ROMs 122. Fourth layer 230 contains operating system boot sector(s) 132. These are resident on the bootable device and are responsible for loading operating system kernel 142. Fifth layer 240 contains operating system 142, and sixth level 250 contains user level programs 252 and any network hosts 254.

The transition between layers in a traditional boot process, as discussed above, is accomplished with a jump or call instruction without any attempt at verifying the integrity of the next layer. AEGIS, on the other hand, uses public key cryptography and cryptographic hashes to protect the transition from each lower layer to the next higher one, and its recovery process ensures the integrity of the next layer in the event of failures.

The pseudo code for the action taken at each layer, L, before transition to layer L+1, ie. at step 266, 274, 286, and 292, is:

```
if (IntegrityValid(L+1))) {
    GOTO (L+1);
} else {
    GOTO (Recovery);
}.
```

AEGIS modifies the boot process as shown in FIG. 1a by dividing system BIOS 112 into two logical sections. First section 202 contains the "trusted software", the bare essentials needed for integrity verification and recovery. Second, section 212 contains the remainder of the system BIOS 112 and the CMOS memory. First section 202 and second section 212 can be contained within a single flash ROM, such as the Intel 28F001BX-B which has an 8KB block that can be protected from reprogramming while the remainder of the ROM can be reprogrammed. Ideally, first section 202 is stored on this 8KB flash boot block to prevent tampering. Alternatively, an additional ROM card can be used to store the "trusted software", if memory constraints prevent the inclusion of the "trusted software" within the BIOS ROM. Similarly, if the computer system has a cryptographic coprocessor, such as the IBM 4758 PCI Cryptographic Coprocessor, or other preexisting cryptographic support, the cryptographic code and public key certificates could be removed from first section 202 and the coprocessor or other device could provide the cryptographic support for the integrity verification process.

First section 202 executes and performs the standard checksum calculation over its address space, step 262, to protect against ROM failures. Following successful completion of the checksum, step 263, the cryptographic hash of second section 212 is computed, step 264, and verified against a stored signature, step 266. If the signature is valid, control is passed to second section 212.

Second section 212 proceeds normally with one change. Once second section 212 has performed all of its power on tests, it begins searching for expansion card ROMs 122, step 268. Once a valid signature is found by second section 212, step 270, control is passed to expansion card ROM 122. However, prior to passing control to expansion ROM 122, a cryptographic hash is computed, step 272, and verified against a stored digital signature for the expansion card, step 274. If the signature is valid, then control is passed to the expansion ROM 122 and it is executed. This process continues until the entire ROM space is searched. Once the verification of each expansion ROM 122 is complete, second section 212 passes control to the operating system bootstrap code, step 278. The bootstrap code was previously verified as part of second section 212, and thus no further verification is required. The bootstrap code finds a bootable device by following the CMOS search order, step 280, and verifies boot sector 132, step 286, after computing a cryptographic hash of boot sector 132, step 284. Failure to find a bootable disk in step 280 may be resolvable through recovery process, step 298.

If boot sector 132 is verified successfully, control is passed to it, step 288. Finally, boot sector 132 computes a cryptographic hash of operating system kernel 142, step 290, and operating system kernel 142 is verified by boot sector 132, step 292, before passing control to it, step 294. If a secondary boot sector is required (not shown), then it is verified by primary block sector 132 before passing control to it. Any integrity failures identified in the above process are recovered through a trusted repository, step 298, as discussed below.

In the AEGIS boot process, either the operating system kernel is started, or a recovery process is entered to repair any integrity failure detected. Once the repair is completed, the system is restarted (warm boot) to ensure that the system boots. This entire process occurs without user intervention.

Ensuring the integrity could also be done with the use of a modification detection code (MDC) with an increase in performance and a loss of security.

B. Integrity Policy/Trusted Repository

The AEGIS integrity policy prevents the execution of a component if its integrity can not be validated. There are three reasons why the integrity of a component could become invalid. The integrity of the component could change because of some hardware or software malfunction, the integrity of the component could change because of some malicious act, or the component's certificate time stamp may no longer be valid. In each case, AEGIS attempts to recover from a trusted repository, step 298, as discussed below. Should a trusted repository be unavailable after several attempts, then the client's further action depends on the security policy of the user. For instance, a user may choose to continue operation in a limited manner or may choose to halt operations altogether.

The AEGIS Integrity Policy can be represented by the following pseudo code:

```
StartOver:
if (ComponentCertificateValid) {
    if (ComponentIntegrityValid) {
        continue;
    } elseif (Recover (Component))
        goto StartOver;
    } else {
        User_Policy ();
    }
} else if (Recover(Certificate)) {
    goto StartOver;
    } else {
        UserPolicy ();
    }
}
```

The trusted repository can either be an expansion ROM board, not shown, that contains verified copies of the required software or it can be network host 254.

The use of network host 254 as the trusted repository is accomplished through the addition of an inexpensive PROM board, and modifications to AEGIS ROM 256. BIOS 112 and AEGIS ROM 256 contain the verification code, and public key certificates. AEGIS ROM 256 also contains code that allows the secure recovery of any integrity failures found during the initial bootstrap. In essence, the trusted software serves as the root of an authentication chain that extends to the operating system and potentially beyond to application software. If the component that fails its integrity check is a portion of BIOS 112, then it must be recovered from AEGIS ROM 256. The recovery process is a simple memory copy from the address space of AEGIS ROM 256 to the memory address of the failed component, in effect shadowing the failed component. A failure beyond BIOS 112 causes the system to boot into a recovery kernel contained on AEGIS ROM 256. The recovery kernel contacts a "trusted" host through a secure protocol, as discussed below, to recover a verified copy of the failed component. The failed component is then shadowed or repaired, if possible, and the system is restarted.

Where network host 254 is the trusted repository, the detection of an integrity failure causes the system to boot into a recovery code contained on the AEGIS ROM 256. The recovery code contacts a "trusted" host through the AEGIS recovery protocol, discussed below, to recover a signed copy of the failed component. The failed component is then shadowed or repaired, and the system is restarted (warm boot). Note that when the boot process enters the recovery procedure it becomes isomorphic to a secure network boot, except that in AEGIS only the needed bootstrap components are transferred. This fact is leveraged by adding authentication to the well known network protocols supporting the boot process (DHCP and TFTP) and using them as the recovery protocol, as discussed below.

In addition to ensuring that the system boots in a secure manner, AEGIS can also be used to maintain the hardware and software configuration of a machine. Since AEGIS maintains a copy of the signature for each expansion card (ideally the signature would be embedded in the firmware of the ROM), any additional expansion cards will fail the integrity test. Similarly, a new operating system cannot be started since the boot block and kernel would change, and the new boot block would fail the integrity test.

C. System Performance

In AEGIS, system integrity is preserved through the chain of integrity checks in the bootstrap process. The ideal authentication chain produced by each layer verifying the next can be represented by the recurrence:

$$I_o = \text{True},$$

$$I_{i+1} = \{I_i \wedge V_i(L_{i+1}) \text{ for } 0 < i \leq 4$$

$I_i$ is a boolean value representing the integrity of layer I, and $\wedge$ is the boolean and operation. $V_i$ is the verification function associated with the $i^{th}$ layer. $V_i$ takes as its only argument the layer to verify, and it returns a boolean value as a result. The verification function performs a cryptographic hash of the layer, and compares the result to the value obtained from a stored signature for the layer. As stated earlier, the IBM PC does not lend itself to such a boot process. Instead, we alter the recurrence to:

$$I_o = \text{True},$$

$$I_{i+1} = \begin{cases} I_i \wedge V_i(L_{i+1}) & \text{for } i = 0, 3, 4, \\ I_i \wedge \sum_{l+1}^{n} V_i(L_{i+1}^l) & \text{for } i = 1, \\ I_i \wedge V_{i-1}(L_{i+1}) & \text{for } i = 2. \end{cases}$$

Here, n represents the number of expansion boards in the system. Using the recurrence relation shown in this equation, the estimated increase in boot time ($T_A$), without integrity failures, between AEGIS and a standard IBM PC can be computed using the following equation:

$$T_\Delta = t(V_0(L_1)) + t\left(\sum_{l=1}^{n} V_1(L_2^l)\right) + t(V_1(L_3)) + t(V_3(L_4))$$

where t(op) returns the execution time of op. In estimating the time of the verification function, $V_i$, the BSAFE benchmarks for an Intel 90 Mhz Pentium computer, shown in the table below, are used.

| Algorithm | Time |
|---|---|
| MD5 | 13,156,000 bytes/sec |
| RSA verify (512 bit) | 0.0027 sec |
| RSA verify (1024 bit) | 0.0086 sec |
| RSA verify (2048 bit) | 0.031 sec |

The cost of verification includes time required for computing a MD5 message digest, and the time required to verify the digest against a stored signature. Any signatures embedded in the public key certificate are ignored at the moment.

BIOS 112 is typically one megabit (128 kilobytes), and expansion ROMs 122 are usually 16 kilobytes, with some, such as video cards, as large as 64 kilobytes. For analysis purposes, it is assumed that one 64 kilobyte card and two 16 kilobyte cards are present. The size of boot sectors 132 for FreeBSD 2.2 (August 1996 Snapshot) are 512 bytes for the primary boot sector 132, 6912 bytes for the secondary boot sector (not shown), and 1352 kilobytes for the size of GENERIC kernel 142. Using the performance of MD5 from table 1, the time required to verify each layer using a 1024 but modulus is:

$t(V_0(L_1)) = 0.0185$ seconds $t(V_1(L_2)) = 0.0160$ seconds $t(V_1(L_3)) = 0.018$ seconds $t(V_3(L_4)) = 0.114$ seconds Summing these times gives $T_A = 0.1665$ seconds which is insignificant compared to the length of time currently needed to bootstrap an IBM PC.

III. AEGIS Network Recovery Protocol

The AEGIS network recovery protocol combines protocols and algorithms from networking and cryptography to ensure the security of the protocol. The algorithms and protocols used are discussed first below and then the implementation of these algorithms and protocols in the AEGIS recovery process is discussed.

A. Digital Certificates

The usual purpose of a digital certificate with respect to public key cryptography is to bind a public key with an identity. While this binding is essential for strong authentication, it severely limits the potential of certificates, e.g., anonymous transactions. The most widely used certificate standard, the X.509 and its variants, provide only this binding. The X.509 standard, also, suffers from other serious problems in addition to its limited use. The most significant is ambiguity in the parsing of compliant certificates because of its use of the Basic Encoding Rules (BER). The encoding rules also require a great deal of space to implement, and the encoded certificates are usually large.

Because of the limits and problems with the X.509 certificate standard, a subset of the proposed SDSI/SPKI 2.0 certificate structure, see Carl M. Ellison, SDSI/SPKI BNF, *Private E-mail*, July 1997, can be used instead. The SDSI/SPKI format does not suffer from the same problems as X.509, and it offers additional functionality. The small subset of SDSI/SPKI needed for AEGIS is referred to here as SDSI/SPKI Lite. Below is the set of all possible strings of symbols that constitute legal programs in SDSI/SPKI Lite in extended Backus-Naur Form (BNF):

<byte-string>::<bytes>;
<bytes>::<decimal>":"{binary byte string of that length};
<cert>::"
   ("'"cert"<issuer><subject><deleg>?<tag><valid>?")";

```
<client>::="("client"<cnonce>?<msg-hash>?")";
<cnonce>::="("cnonce"<byte-string>")";
<date>::<byte-string>;
<ddigit>::="0"|<nzdigit>;
<decimal>::<nzdigit><ddigit>;
<deleg>::="("propagate"")";
<hash>::="("hash"sha1"<byte-string>")";
<issuer>::="("issuer"<issuer-name>")";
<issuer-name>::<principal>;
<msg-hash>::="("msg-hash"<hash>")";
<not-after>::="("not-after"<date>")";
<not-before>:: "("not-before"<date>")";
<nzdigit>::="1"|"2"|"3"|"4"|"5"|"6"|"7"|"8"|"9";
<obj-hash>::="("object-hash"<hash>")";
<principle>::<pub-key>|<hash-of-key>;
<pub-key>::="("public-key"<pub-sig-alg-id><s-expr>*
    <uri>?")";
<pub-sig-alg-id>::="dsa-sha1";
<s-expr>::="("<byte-string>")";
<server>::="("server"<dh-g>?<dh-p>?<dh-
    y>?<snonce>?<msg-hash>?")";
<signature>::="("signature"<hash><principle><byte-
    string>")";
<subject>::<principle>|<obj-hash>;
<tag>::="("tag"")"|"("tag"<tag-body>")";
<tag-body>::<client>|<server>;
<valid>::<not-before>?<not-after>?;
```

SDSI/SPKI Lite provides for functionality beyond the simple binding of an identity with a public key. Identity based certificates require the existence of an Access Control List (ACL) which describes the access rights of an entity. Maintaining such lists in a distributed environment is a complex and difficult task. In contrast, SDSI/SPKI Lite provides for the notion of a capability. In a capability based model, the certificate itself carries the authorizations of the holder eliminating the need for an identity infrastructure and access control lists. In AEGIS, two capabilities, SERVER and CLIENT, are used with the obvious meanings. Additionally, AEGIS uses only three types of certificates. The first is an authorization certificate. An example of an AEGIS Authorization Certificate is shown below:

```
((cert (issuer (hash-of-key (hash sha1 caked)))
    (subject (hash-of-key (hash sha1 keyholderkey)))
    (tag (client))
    (not-before 03/29/97-0000)
    (not-after 03/29/98-0000))
 (signature (hash sha1 hashbytes)
    (hash-of-key (hash sha1 cakey))
    (sigbytes)))
```

This certificate, signed by a trusted third party or certificate authority, grants to the keyholder (the machine that holds the private key) the capability to generate the second type of certificate, an authentication certificate. The authentication certificate demonstrates that the client or server actually hold the private key corresponding to the public key identified in the authentication certificate. An example of an AEGIS client authentication certificate is shown below:

```
((cent (hash-of-key (hash sha1 clientkey)))
    (subject (hash-of-key (hash sha1 clientkey)))
    (tag (client (cnonce bytes) (msg-hash
        (hash sha1 bytes))))
    (not-before 09/01/97-0000)
    (not-after 09/01/97-0000)) (signature (hash sha1
        hashbytes)
    (public-key dsa-sha1 clientkey)
    (sigbytes)))
```

An example of an AEGIS server authentication certificate is shown below:

```
((cert (issuer (hash-of-key (hash sha1 serverkey)))
    (subject (hash-of-key (hash sha1 serverkey)))
    (tag (server (dh-g gbytes)
        (dh-p pbytes)
        (dh-Y ybytes)
        (msg-hash
            (hash sha1 hbytes))
        (cnonce cbytes)
        (snonce sbytes)))
    (not-before 09/01/97-0900)
    (not-after 09/01/97-0900)) (signature
    (hash sha1 hashbytes)
    (public-key dsa-sha1 serverkey)
    (sigbytes)))
```

In the above authentication certificate examples, the nonce field in the client authentication certificate is used along with a corresponding nonce in the server authentication certificate to ensure that the authentication protocol is "Fail Stop" detecting and to prevent active attacks such as a man-in-the-middle attack. The msg-hash field ensures that the entire message containing the certificates has not been modified. Using the msg-hash in the authentication certificate eliminates a signature and verification operation since the entire message no longer needs to be signed. The additional server fields are used to pass optional Diffie-Helman (DH) parameters, discussed below, to the client so that these parameters need not be global values. While clients are free to set the validity period of the authentication certificate to whatever they desire, it is expected that clients will keep the period short.

The third and final certificate format is the component signature certificate. An example of an AEGIS component certificate is shown below:

```
((cert (issuer (hash-of-key (hash sha1 approverkey)))
    (subject (hash sha1 hashtytes))
    (not-before 09/01/97-0000)
    (not-after 09/05/97-0000))
 (signature (hash sha1 hashbytes)
    (public-key dsa-sha1 approverkey)
    (sigbytes)))
```

This certificate is either embedded in a component or stored in a table. It is used with the AEGIS boot process described above.

Requiring each client to maintain a Certificate Revocation List (CRL) places a significant burden on the non-volatile storage of the client. Rather than use CRLs, the validity period of the certificates can be kept short, as in the SDSL/SPKI model, requiring the client to update the certificates when they expire. This serves two purposes beyond the ability to handle key revocation. First, the storage requirements for CRLs are eliminated. Second, the amount of system maintenance required of the client potentially can be reduced. Since the client must connect to the server on a regular basis to update the component certificates, the server can, at the same time, update the actual component as well if a new version is available.

B. Algorithms

1. Diffie-Rellman Key Agreement

The Diffie Hellman Key Agreement (DH), discussed in U.S. Pat. No. 4,200,770 to Hellman et al., incorporated herein by reference, permits two parties to establish a shared secret between them. Unfortunately, the algorithm as originally proposed is susceptible to a man-in-the-middle attack. The attack can be defeated, however, by combining DH with a public key algorithm such as DSA as proposed in the Station to Station Protocol, discussed in *Authentication and Authenticated Key Exchanges*, W. Diffie, P. C. van Oorschot, and M. J. Wiener, *Designs, Codes and Cryptoraphy*, 2:107–125, 1992, incorporated herein by reference.

The DH algorithm is based on the difficulty of calculating discrete logarithms in a finite field. Each participant agrees to two primes, g and p, such that g is primitive mod n. These values do not need to be protected in order to ensure the strength of the system, and therefore can be public values. Each participant then generates a large random integer. Bob generates x as his large random integer and computes $X=g^x$ mod p. He then sends X to Alice. Alice generates g as her large random integer and computes $Y=g^y$ mod p. She then sends Y to Bob. Bob and Alice can now each compute a shared secret, k, by computing $k=Y^x$ mod p and $k=X^y$ mod p, respectively.

2. Digital Signature Standard

The Digital Signature Standard (DSS), discussed in *Digital Signature Standards*, Technical Report FIPS-186, U.S. Department of Commerce, May 1994, incorporated herein by reference, includes a digital signature algorithm (DSA) and a cryptographic hash algorithm (SHA1). DSA produces a 320 bit signature using the following parameters:

A prime, p, between 512 and 1024 bits in length. The size of the prime must also be a multiple of 64.

A 160 bit prime factor, q, of p−1.

g, where $g=h^{(p-1)/q}$ mod p and h is less than p−1 such that g is greater than 1.

x, where x is less than q.

y, where $y=g^x$ mod p.

The parameters p, q, and g are public. The private key is x, and the public key is y. A signature of a message, M, is computed in the following manner. The signer generates a random number, k, that is less than q. They then compute $r=(g^k \bmod p) \bmod q$, and $s=(k^{-1}(SHA1(M)+xr)) \bmod q$. The values r and s, each 160 bits in length, comprise the signature. The receiver verifies the signature by computing:

$$w=s^{-1} \bmod q$$

$$u_1=(SHA1(M)*w) \bmod q$$

$$u_2=(\circledR *w) \bmod q$$

$$v=((g^{u_1}*y^{u_2}) \bmod p) \bmod q.$$

The signature is verified by comparing v and r. If they are equal, then the signature is valid.

3. SHA1 Message Authentication Code

Message Authentication Codes (MAC) utilize a secret, k shared between the communicating parties and a message digest. AEGIS uses the Secure Hash Algorithm (SHA1), discussed in *Secure Hash Standard*, Technical Report FIPS-180-1, U.S. Department of Commerce, April 1995 (also known as 59 Fed Reg 35317 (1994)) incorporated herein by reference, and the HMAC, described in *HMAC: Keyed-Hashing for Message Authentication*, Internet RFC 2104, February 1997, incorporated herein by reference. The MAC is defined as:

SHA1 (kXOR opad, SHA1 (kXOR ipad, M)), where M is the message or datagram, opad is an array of 64 bytes each with the value 0x5c, and ipad is an array of 64 bytes each with the value 0x36. k is zero padded to sixty four bytes. The result of this MAC is the 160-bit SHA1 digest.

C. Protocols

1. DHCP—Dynamic Host Configuration Protocol

The DHCP protocol, discussed in *Dynamic Host Configuration Protocol*, Internet RFC 2131, March 1997, incorporated herein by reference, provides clients the ability to configure their networking and host specific parameters dynamically during the boot process. The typical parameters are the IP addresses of the client, gateways, and DNS server. DHCP, however, supports up to 255 configuration parameters, or options. Currently approximately one hundred options are defined for DHCP, see *DHCP Options and BOOTP Vendor Extensions*, Internet RFC 2132, March 1997, incorporated herein by reference. One of these options is an authentication option which is described below.

Figure 3:
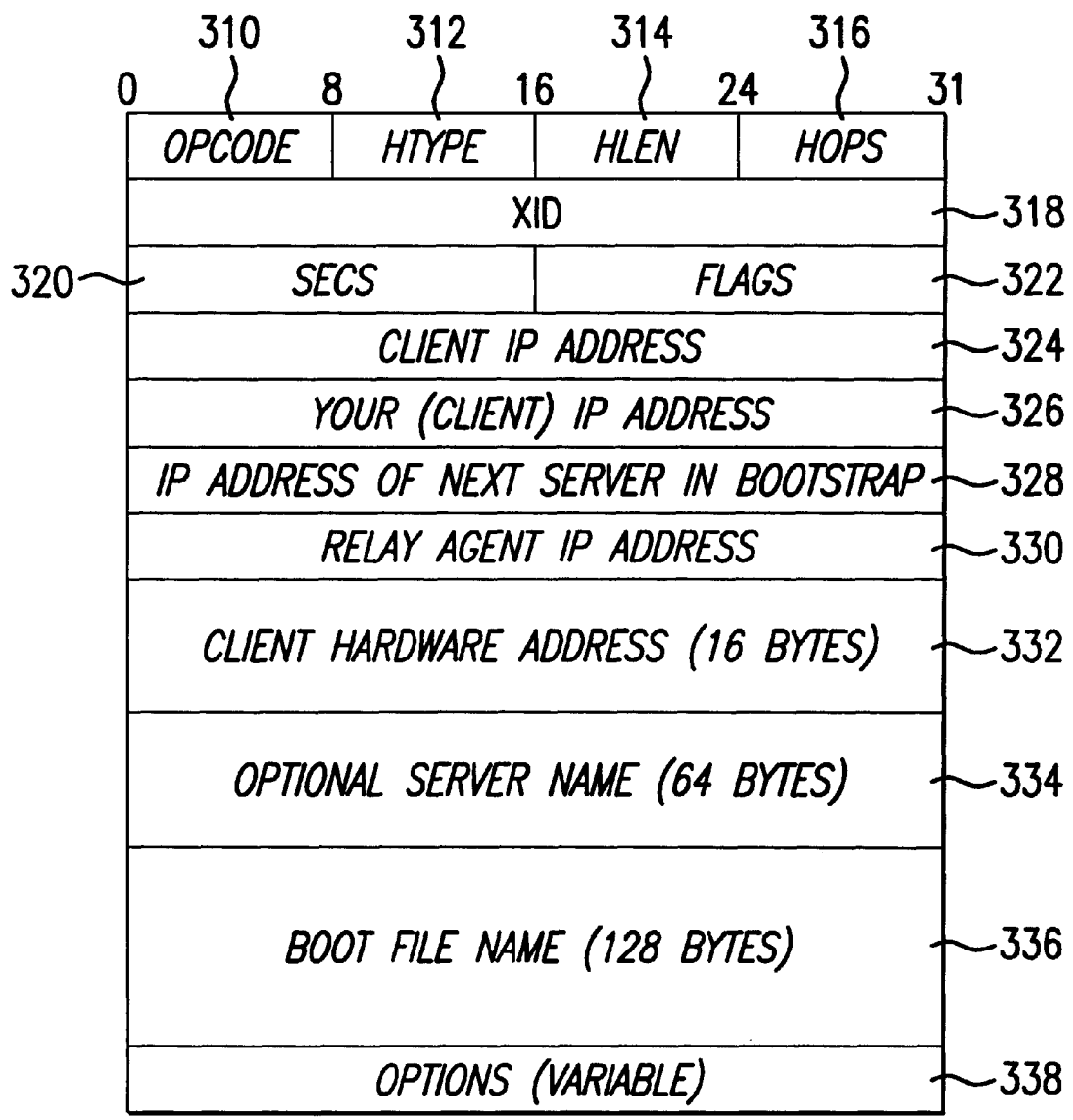
FIG. 3 is a functional diagram of the format of a DHCP message.

The format of a DHCP message is shown in FIG. 3. The first field in the DHCP message is the opcode 310. Opcode 310 can have one of two values, 1 for a BOOTREQUEST message, and 2 for a BOOTREPLY message. The next field, htype 312, is the hardware address type defined by the "Assigned Numbers" RFC, see J. Reynolds and J. Postel, *Assigned Numbers*, Interent RFC 1700, October 1994, incorporated herein by reference. The field hlen 314 indicates the length of the hardware address. The field hops 316 is set to zero by the client and used by BOOTP relay agents to determine if they should forward the message. The field xid 318 is a random number chosen by the client. Its use is to permit the client and the server to associate messages between each other. The field secs 320 is set by the client to the number of seconds elapsed since the start address acquisition process. Currently, only the leftmost bit of the flags 322 field is used to help solve an IP multicast problem. The remaining bits must be zero. The field ciaddr 324 is the client address if the client knows it already. The field yiaddr 326 is "your" address set by the server if the client did not know its address or had a bad one. The field giaiddr 330 is the relay agent address., chaddr 332 is the client's hardware address, same 334 is an optional null terminated string containing the server's name, and file 336 is the name of the boot file. In AEGIS, this is the name of the component to recover. Finally, options 338 is a variable length field containing any options associated with the message.

Figure 4:
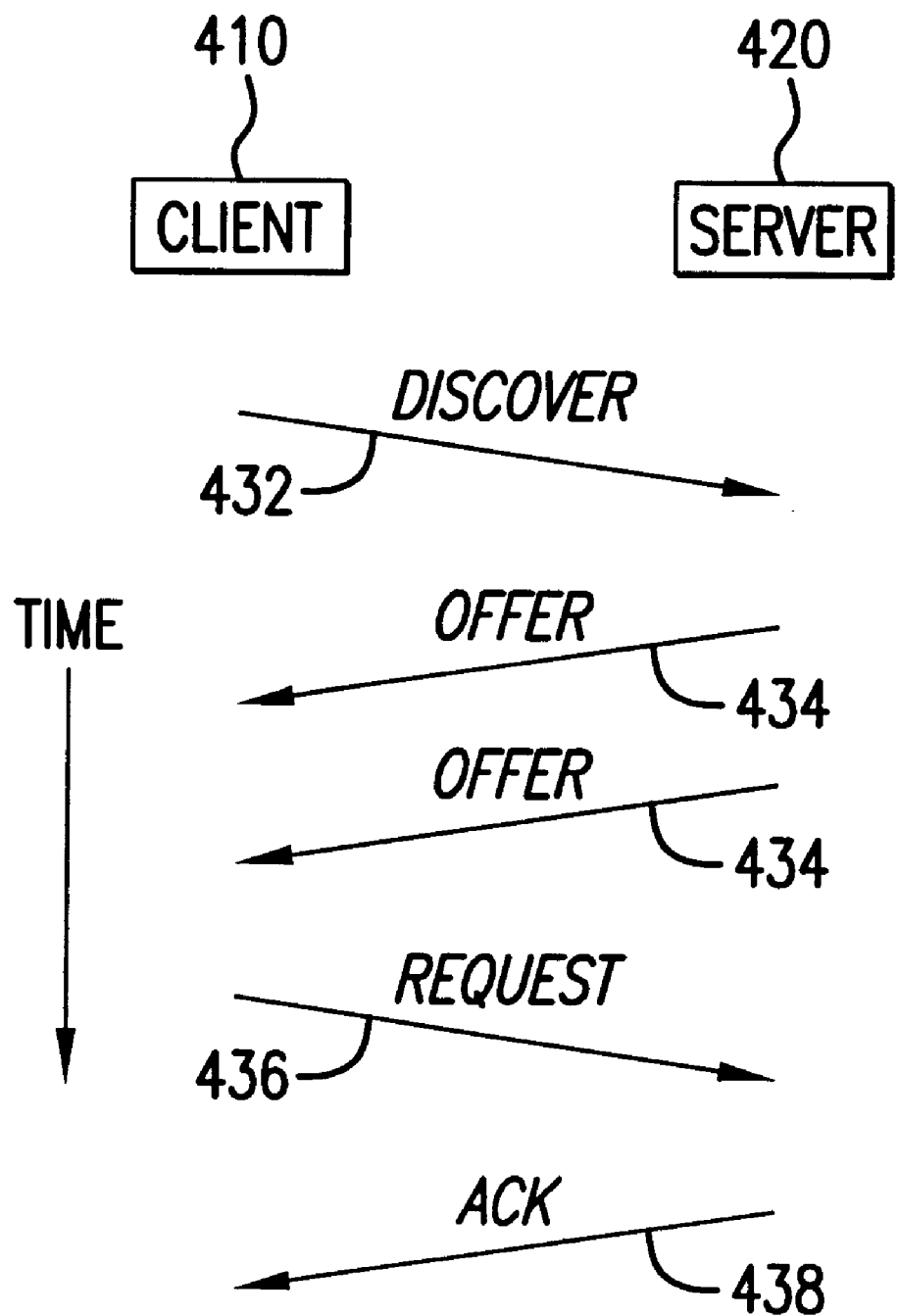
FIG. 4 is a flow chart showing the flow of the initial DHCP message exchange between a client and a server.

The initial message exchange between client 410 and server 420 is shown in FIG. 4. Client 410 begins the process by sending a DHCPDISCOVER message as a broadcast message on its local area network, step 432. The broadcast message may or may not be forwarded beyond the LAN depending on the existence of relay agents at the gateways. Any or all DHCP servers 420 respond with a DHCPOFFER message, step 434. Client 410 selects one of the DHCPOFFER messages and responds to that server 420 with a DHCPREQUEST message, step 436. Server 420 acknowledges the DHPREQUEST message with a DHCPACK, step 438.

In addition to providing networking and host specific parameters, DHCP can provide the name and server location of a bootstrap program to support diskless clients. After the client receives the IP address of the boot server and the name of the bootstrap program, the client uses TFTP, discussed below, to contact the server and transfer the file.

2. TFTP-Trivial File Transfer Protocol

TFTP, discussed in *The TFTP Protocol* (*revision* 2), by K. R. Sollins, Interent RFC 1350, July 1992, incorporated herein by reference, was designed to be simple and small enough to fit in a ROM on a diskless client. Because of this, TFTP uses UDP, User Datagram Protocol, rather than TCP, Transport Control Protocol, with no authentication included in the protocol. TFTP does, however, have an option capability similar to DHCP, see G. Malkin and A. Harkin, *TFTP Option Extension,* Internet RFC 1782, March 1995, incorporated herein by reference.

Figure 5:
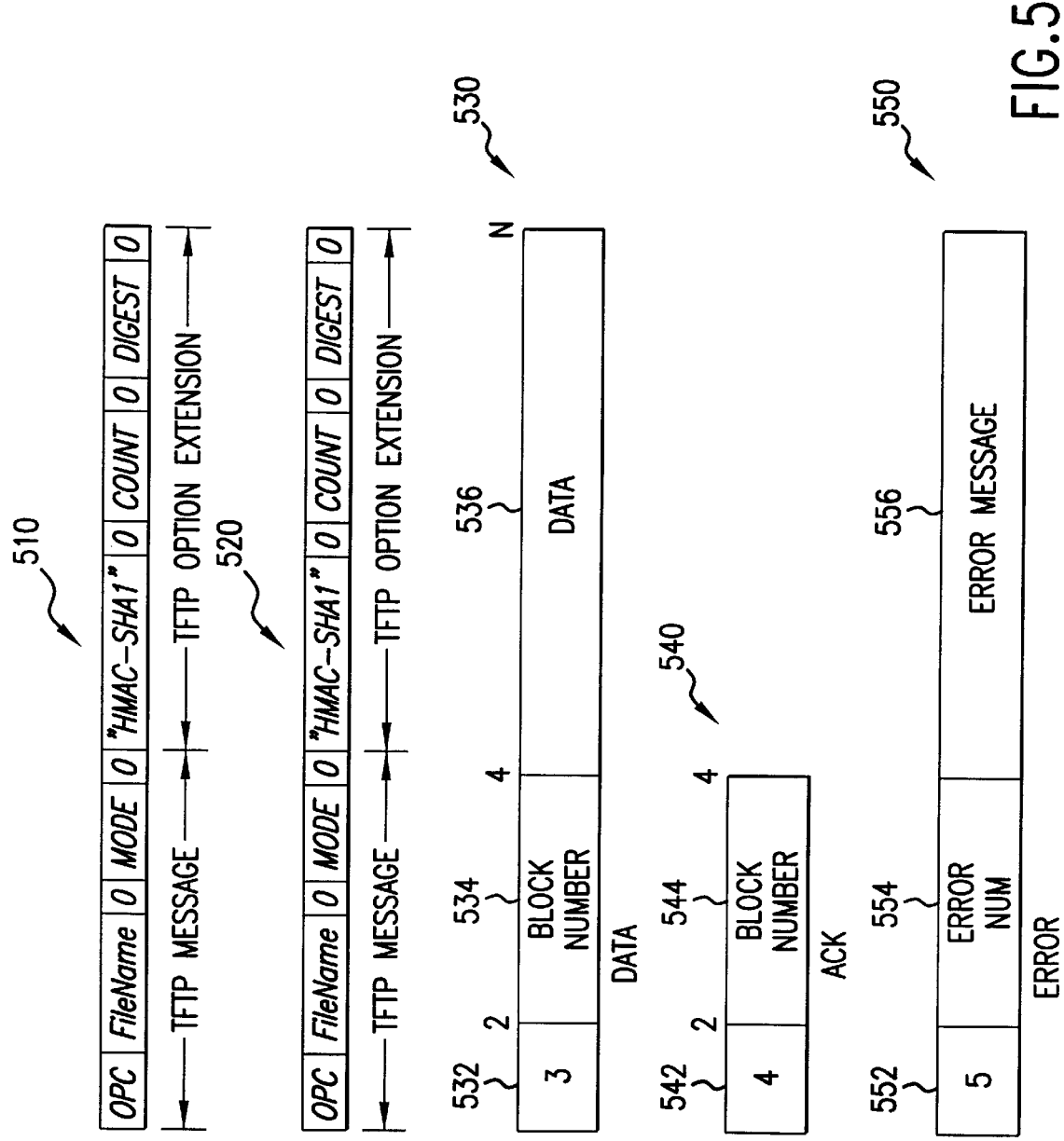
FIG. 5 is a functional diagram of the format of the five TFTP messages.

TFTP has five unique messages that are identified by a two byte opcode value at the beginning of the packet. Read Request (RRQ) 510 and Write Request (WRQ) 520 packets, opcodes 1 and 2 respectively, share the same format, as shown in FIG. 5. Data (DATA) packet 530, as shown in FIG. 5, contains three fields. The first field, 532, is the two byte opcode, 3 for DATA. Following the opcode is a two byte field, 534, containing the block number of the data, beginning at 1 and increasing. The third and final field of the packet, 536, contains the actual block of data transferred. Typically, the block size is 512 bytes. However, the size can be increased through the use of the TFTP options. Where the block is smaller than the blocksize, this identifies the packet as the final DATA packet 530. Each DATA packet 530 is acknowledged by a four byte ACK packet 540, opcode 4, as shown in FIG. 5, containing the opcode, 542, and the acknowledged block number, 544. The final packet, opcode 5, is ERROR packet 550 with three fields, as shown in FIG. 5. The first, 552, is the two byte opcode. The second, 554, is a two byte error code, and the final field, 556, is a zero terminated netascii string containing an error message.

A TFTP session for reading/downloading a file begins with the client 410 sending an RRQ packet 510 to the sever 420 and receiving either a first DATA packet 530 in response, or an ERROR packet 550 if the request was denied. The client 410 responds with an ACK packet 540, and the process continues until the file is transferred.

D. Implementation

Figure 6:
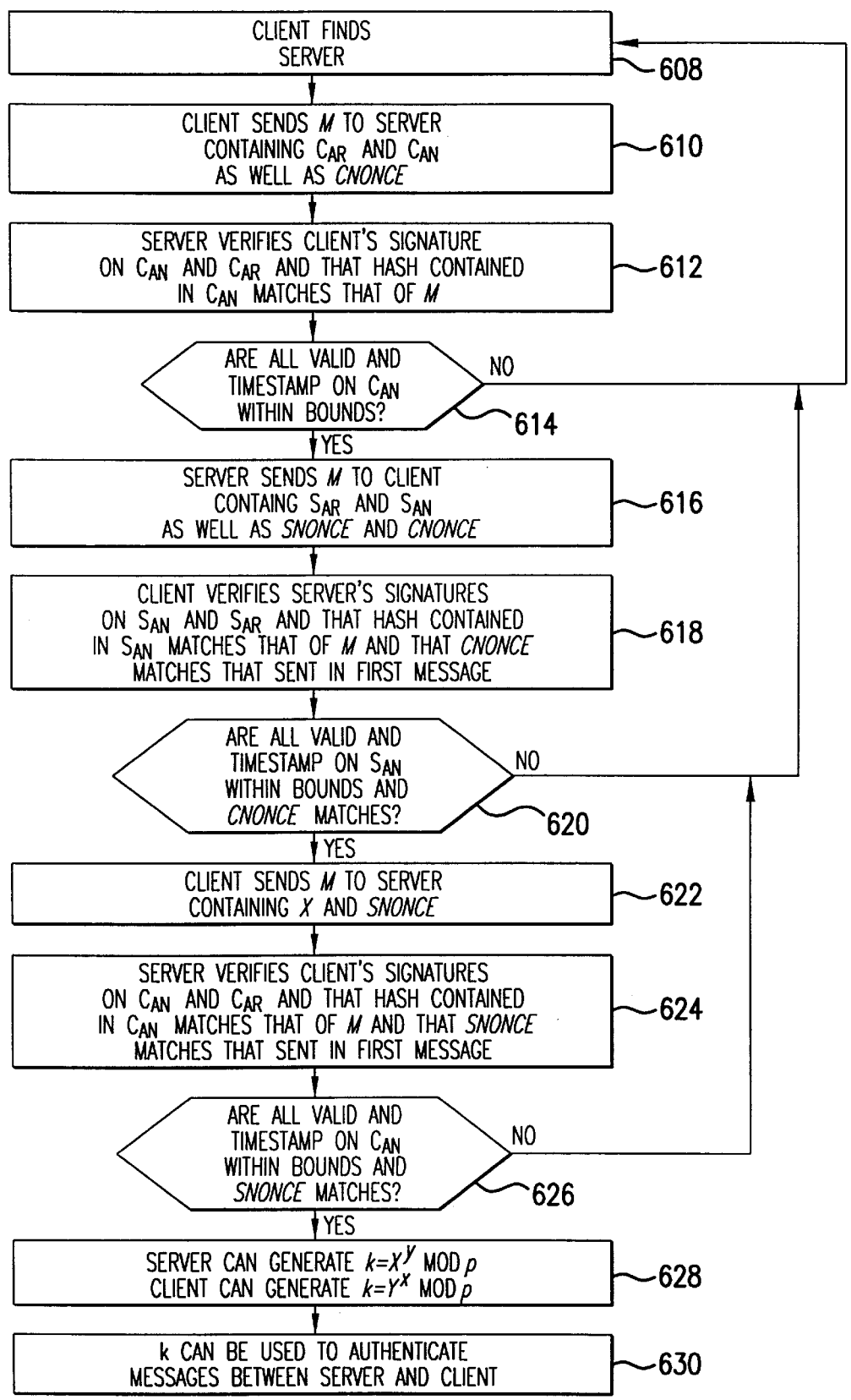
FIG. 6 is a flow chart showing the flow of the message exchange between a client and a server to communicate and establish a shared secret of the present invention.

Client 410 (AEGIS) and Server 420 (Trusted Repository) wish to communicate and establish a shared secret after authenticating the identity of each other. There has been no prior contact between Client 410 and Server 420 other than to agree on a trusted third party (CA), or a public key infrastructure, to sign their authorization certificates, $C_{AR}$ and $S_{AR}$. Server 420 and Client 410 also need to have a copy of the trusted third party's public key, $P_{CA}$, for use in verifying each other's authorization certificates. The process Client 410 and Server 420 follow is shown in FIG. 6. First, Client 410 sends a message out over the network to locate a Server 420, step 608. When Server 420 is found, Client 410 sends a message, M, to Server 420 containing the Client's authorization certificate, $C_{AR}$, authentication certificate, $C_{AN}$, and nonce, cnonce, step 610. Server 420 receives the message, M, and verifies Client's signature on the authentication certificate, $C_{AN}$ and that the hash contained in the authentication certificate, $C_{AN}$, matches that of the message, M, step 612. The signature of the CA on the authorization certificate, $C_{AR}$, is also verified. If all are valid and the timestamp on the authentication certificate, $C_{AN}$, is within bounds, step 614, then Server 420 sends to Client 410 a message, M, containing its authorization certificate, $S_{AR}$, and authentication certificate, $S_{AN}$, step 616. Server's authentication certificate, $S_{AN}$, may include the optional DH parameters, g and p, and Y, where $Y=g^y$ mod p. If the DH parameters are not included in the certificate, then default values for g and p are used. Server's nonce, snonce, and Client's nonce, cnonce, are also included in message, M. Client 410 receives message, M, and verifies the signatures on the authentication certificate, $S_{AN}$, and authorization certificate, $S_{AR}$, and that the hash in Server's authentication certificate matches the message hash, and that cnonce matches that sent in the first message, step 618. If all are valid and the timestamp value of the authentication certificate is within bounds and cnonce matches that sent in the first message, step 620, then Client 410 sends a signed message to Server 420 containing its DH parameter X where $Y=g^x$ mod p and Server's nonce snonce, step 622. Server 420 receives the message and verifies the signatures and that snonce matches that sent in its previous message, step 624. If both are valid, step 626, then Server 420 can generate the shared secret, k, using $k=X^y$ mod p and Client 410 similarly can generate the shared secret, k, using $k=Y^x$ mod p, step 628. The shared secret, k, can now be used to authenticate messages between Server 420 and Client 410, step 630, until such time as both agree to change k. The use of the authentication certificates, $C_{AN}$ and $S_{AN}$, assists in ensuring that the protocol is "Fail Stop" through the use of nonces and a short validity period for the certificate. The use of snonce also permits Server 420 to reuse Y over a limited period. This reduces the computational overhead on Server 420 during high activity periods. The potential for a TCPSYN like denial of service attack, is mitigated in the same manner by the authentication certificates. The authorization certificates, $C_{AR}$ and $S_{AR}$, also prevent Clients 410 from masquerading as Server 420 because of the client/server capability tag. This is a benefit not possible with X.509 based certificates.

Subsequent messages, e.g. TFTP messages, use the SHA1 HMAC defined above with a one up counter to prevent replays. The counter is initially set to zero when the shared secret, k, is derived.

Where validation steps, 614, 620, and 626 are unsuccessful in the above process, the process starts over with Client 410 searching for a Server 420, step 608.

E. Using DHCP/TFTP as the AEGIS Recovery Protocol

1. DHCP Authentication Option

Figure 7:
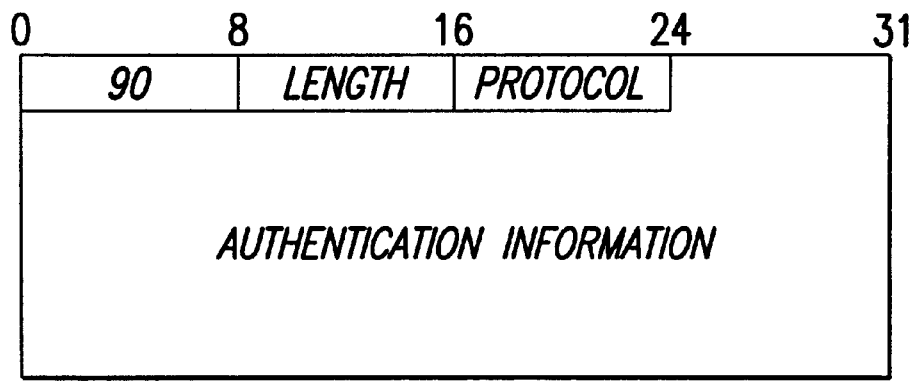
FIG. 7 is a functional diagram of the format of the DHCP Authentication Option Message.

DHCP is extensible through the use of the variable length options field 338 at the end of each DHCP message. The format of the message is shown in FIG. 7. The DHCP authentication option was designed to support a wide variety of authentication schemes by using the single byte protocol and length fields. Unfortunately, a single byte value for the size in octets of authentication information is too small for the AEGIS authentication information. To solve this problem, the choices were to either violate the current DHCP options standard and use a two byte size field and potentially cause interoperability problems, or to place an additional restriction on the AEGIS authentication packet, requiring it to be the last option on any DHCP packet. The latter has been selected in this embodiment. Using this and a unique AEGIS option number permits interoperability with current DHCP servers.

Figure 8:
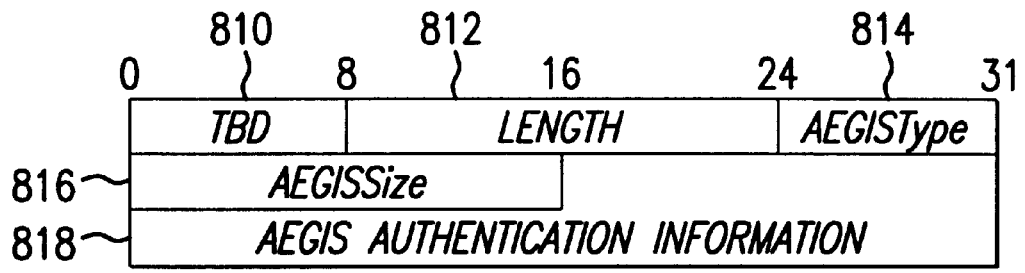
FIG. 8 is a functional diagram of the modified DHCP Authentication Option Message of the current invention.

Since the authentication option message format shown in FIG. 7 is not used, a new DHCP option format for AEGIS Authentication must be defined, as shown FIG. 8. The AEGIS option uses the same basic format as the normal DHCP format., the only difference is the use of a two byte size field. Embedded in the data portion, 818, of the option are the AEGIS certificates, and other data as required. These fields are identified through the use of a one byte AEGIS type, 814, followed by a two byte size field, 816. The AEGIS Authentication format is shown in FIG. 8. The different AEGIS types are shown in the table below:

| Type | Value |
| --- | --- |
| Authorization Certificate | 0 |
| Client Authorization Certificate | 1 |
| Server Authorization Certificate | 2 |

| Type | Value |
| --- | --- |
| Component Authentication Certificate | 3 |
| X value | 4 |
| snonce | 5 |
| signature | 6 |
| SHA1 MAC | 7 |

2. Adding Authentication to TFTP

A new TFTP option is also defined, HMAC-SHA1, that uses the HMAC defined above along with a 32 bit one up counter for use with the TFTP Read (RRQ) 510 and Write (WRQ) 520 requests. The format of a RRQ 510 or WRQ 520 packet with the HMAC option is shown in FIG. 5. The counter is two bytes in length, and its purpose is to prevent replay attacks. Both Client 410 and Server 420 initialize the count to zero immediately after k is derived from the protocol shown in FIG. 6.

The TFTP option extension, however, is not defined for TFTP DATA 530 or ERROR 540 packets. Therefore, those packets must be extended in the same manner as was done with RRQ packet 510 and WRQ packet 520 above. The extended TFTP packet formats are shown in FIG. 5.

Another TFTP implementation problem is how to handle the "lock-step" nature of the protocol and still prevent replays. The solution adopted here is to provide a narrow window for an adversary to obtain a copy of the file from Server 420 without proper authentication by replaying the message to Server 420 before Client's next message. The benefits of this approach, not having to change the TFTP protocol other than a small message format change, outweigh the potential problems associated with dramatically changing the protocol.

3. The AEGIS Recovery Protocol

Once authentication is added to DHCP and TFTP, AEGIS can use them without further modifications as its recovery protocol. In AEGIS, the client follows the DHCP protocol, as shown in FIG. 4, but adds to the DHCPDISCOVER message, step 432, the name of the required component needed followed by the SHAI hash of the component in the boot file name field, 336. Once the DHCP protocol is completed and the shared secret established, the AEGIS client contacts the trusted repository using TFTP with authentication and downloads the new component.

Performance estimates can be made using the times shown in the table below, for results generated using a 200 Mhz PentiumPro with 32 MB of memory.

| Algorithm | Time |
| --- | --- |
| SHA1 | 6.1 MB/sec |
| DSA Verify (1024 bit) | 36 msec |
| DSA Sign (1024 bit) | 23 msec |
| Generate X,Y (1024 bit) | 22 msec |
| Generate k (1024 bit) | 71 msec |

For the purposes of these estimates, it is assumed that each DHCP message is three kilobytes in length. The cost of hashing the first and second message for comparison to the hash contained in the authentication certificate is negligible and therefore not included in the estimates below.

The initial authentication exchange includes the first three DHCP messages, DHCPDISCOVER, step 432, DHCPOFFER, step 434, and DHCPREQUEST, step 436. DHCPDISCOVER, step 432, requires Client 410 to perform one signature operation, and Server 420 must perform two verify operations. Thus, the total cost of this message is 95 msec. The DHCPOFFER message, step 434, requires Server 420 to generate Y and perform one signature operation. Client 410 must perform two verify operations. This results in a message cost of 117 msec. The final message, DHCPREQUEST, step 436, requires Client 410 to generate X and k, and perform one signature operation. Server 420 must perform one verify operation, and generate k resulting in a message cost of 107 msec. Summing the cost of these three messages gives a total cost of 319 msec.

While the above time may seem too high a cost to pay for security, the total time is small when compared to the total time spent booting a computer system. It is unlikely that users will see the increase in time required to perform the authentication.

Subsequent messages use the MAC described earlier, and will likely (in a LAN situation) be bounded by the speed of SHA1, 6.1 MB/sec.

IV. Conclusion

The approach of this invention is to ensure the integrity of the bootstrap process and provide reliability. Ensuring the integrity is provided in the above embodiment by the use of public key cryptography, a cryptographic hash function, and public key certificates. Ensuring the integrity could also be done with the use of a modification detection code (MDC) with an increase in performance and a loss of security. Once an integrity failure is detected, the invention uses a secure protocol to inform a trusted repository that a failure has occurred and to obtain a valid replacement component. While the above embodiment uses well known networking protocols, a custom protocol or various combinations of known protocols could also be used. Additionally while the above embodiment employs cryptographic algorithms for security purposes, if security is not a concern a less robust approach could be used.

The recovery process discussed above is also easily generalized to applications other than the boot process of the present invention, such as standardized desktop management and secure automated recovery of network elements such as routers or "Active Network" elements.

While AEGIS will serve as a strong foundation for future security measures, it also has the potential for reducing the Total Cost of Ownership (TCO) of IBM personal computers. Automatically detecting and repairing integrity failures permits the user to continue to work without the nuisance of a trouble call to the support staff and the associated down time spent waiting. A system administrator can monitor the log of the AEGIS trusted repository and identify those workstations that require "hands on" repairs, e.g. ROM failure, and schedule the work to be done when the user is not using the computer. This permits the system administrator to schedule a trouble call rather than react to it. This greatly reduces the stress on the users and the administrators. AEGIS can also offer the ability to provide automatic updates of the bootstrap components. There are two possible approaches. The first limits the validity period of the cryptographic certificates associated with each component of the bootstrap process. When the certificate expires, AEGIS contacts the trusted repository and either obtains a new certificate in the case where the component does not need an update, or a new component and certificate in the case where a newer version of the component is available. This permits the system administrator to update all of their workstations from a central location without having to visit each individual computer system. The second approach adds a hook, step 261 in FIG. 2c, to the BIOS to contact the trusted repository after initiating POST, step 260. As is shown in FIG. 2c, the remainder of the boot process follows the same procedure as that described for FIG. 2b above. The purpose of this contact is two fold. First, it permits a status monitoring of each workstation. Second, the contact allows centralized updates since the trusted repository can respond back with a "I need to update you" message. Step 261 would be done in the following manner. When Server 420 receives the "I am booting" message from Client 410, Server 420 would check a database containing the configuration of Client 410. Server 420 would then compare that configuration with the current configuration desired for Client 410. If they are different, then Server 420 would instruct Client 410 to download the appropriate changes. AEGIS can also "lock down" the configuration of a system and prevent users from changing operating systems, adding PROM cards, or modifying BIOS settings. Greatly reducing the problems caused by well intentioned, but technically unsophisticated, users.

Figure 2B:
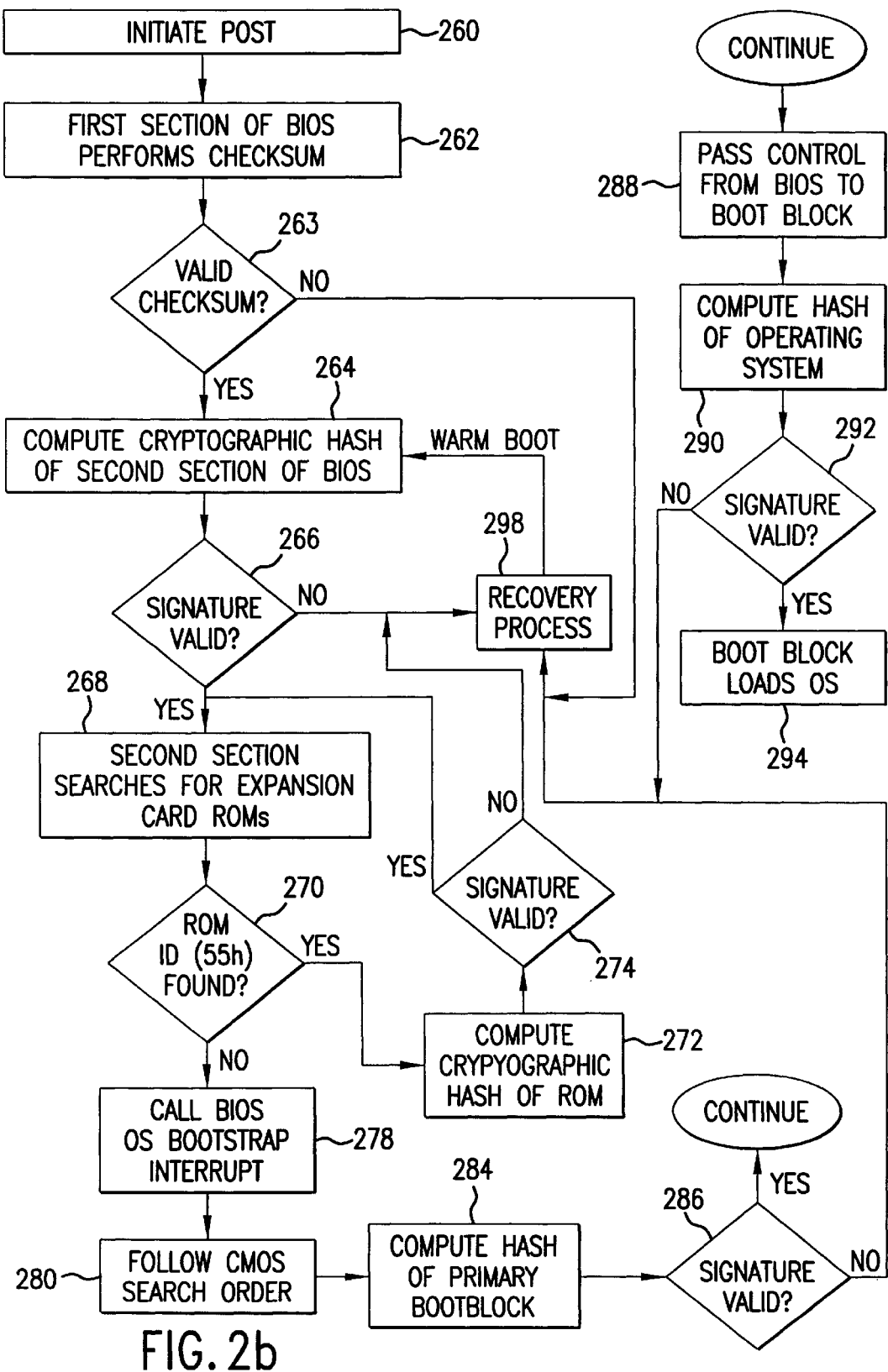
FIG. 2b is a flowchart showing the flow of the AEGIS embodiment of the bootstrap process of the current invention.
Figure 2C:
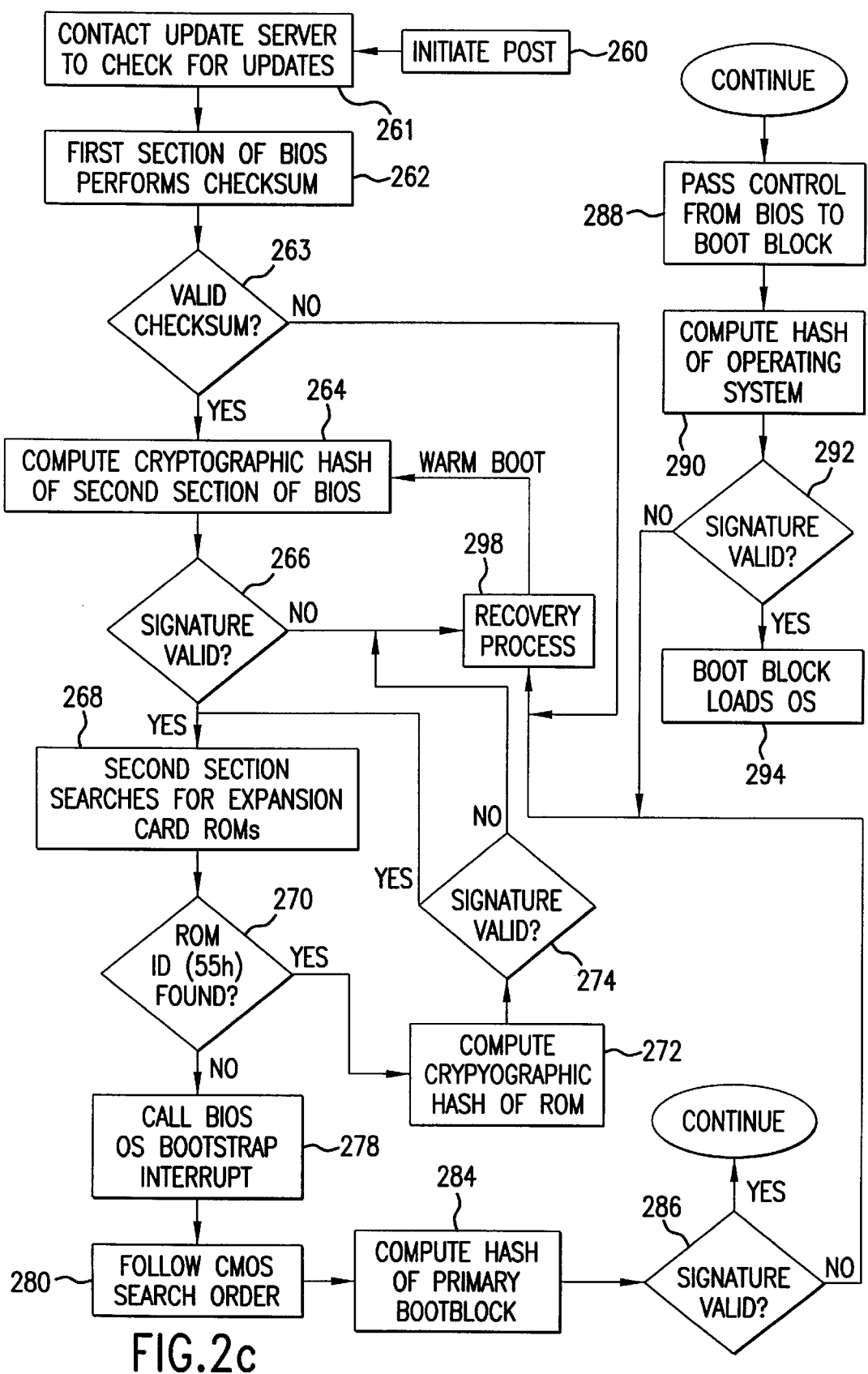
FIG. 2c is a flow chart showing the flow of an embodiment of the current invention in which the system configuration is automatically updated by the trusted repository at the beginning of the boot process of the present invention.
Figure 2D:
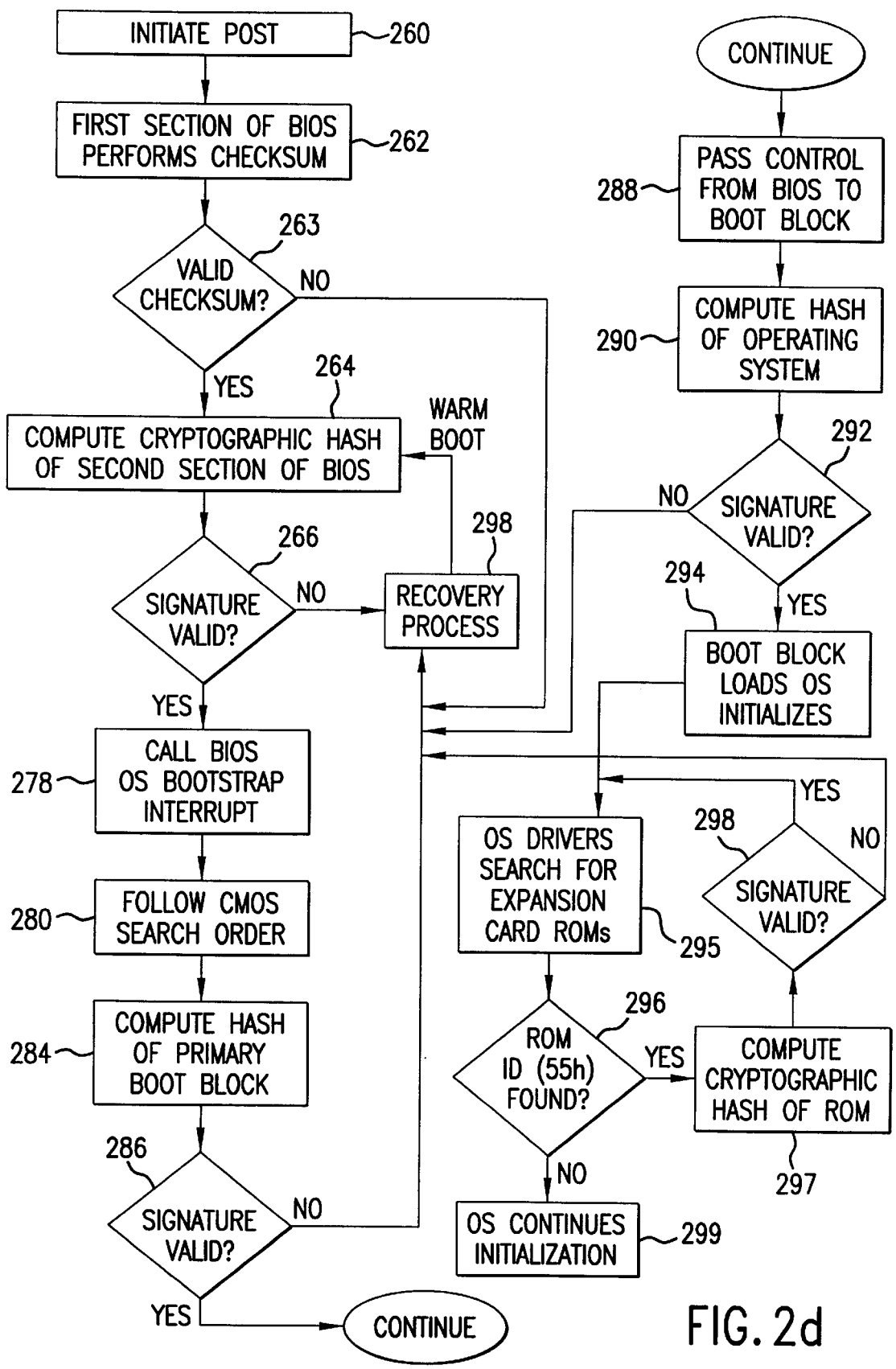
FIG. 2d is a flow chart showing the flow of an embodiment of the current invention in which the expansion card ROMs are detected and verified by the operating system driver interface rather than the BIOS.

An alternate approach to provide a Secure and Reliable Bootstrap is to move the expansion ROM detection and verification routines, steps 268,270,272, and 274 in FIG. 2b, into operating system 142. As is shown in FIG. 2d, after boot sector 132 loads operating system 142, step 294, expansion ROMs 122 can be searched for, step 295, detected, step 296, and verified, step 298, using a computed cryptographic hash, step 297, by the operating system driver interface rather than the BIOS. The initialization of operating system 142 is then allowed to continue, step 299.

While a number of embodiments of the present invention have been described above, they should be understood to have been presented by way of example, not limitation. It will be apparent to persons skilled in the art that various changes in form and detail can be made therein without departing from the spirit and scope of the invention. Thus the present invention should not be limited by the above described exemplary embodiments, but should be defined in accordance with the following claims and their equivalents.

What is claimed is:

1. An architecture for initializing a computer system comprising:
    a processor;
    an expansion bus coupled to said processor;
    a memory coupled to said expansion bus, said memory storing a system BIOS for execution by said processor upon power up of the computer system;
    a plurality of boot components coupled to said expansion bus and accessed by said processor when said system BIOS is executed;
    a trusted repository coupled to said expansion bus; and
    means for verifying the integrity of said boot components and said system BIOS wherein integrity failures are recovered through said trusted repository.

2. An architecture for initializing a computer system according to claim 1, wherein said trusted repository is an expansion ROM coupled to said expansion bus.

3. An architecture for initializing a computer system according to claim 1, wherein said trusted repository is a host computer communicating with said computer system through a communications interface coupled to said expansion bus.

4. A method for initializing a computer system comprising the steps of:
    (1) invoking a Power on Self Test (POST);
    (2) verifying the integrity of a system BIOS;
    (3) verifving the integrity of a boot component; and
    (4) when said boot component fails, recovering said failed boot.

5. A method according to claim 4, wherein step (1) further comprises the step of performing a checksum calculation over the address space of a trusted memory location.

6. A method according to claim 4, wherein step (3) comprises the steps of:
    (a) computing a cryptographic hash value for said boot component; and
    (b) comparing said cryptographic hash value with a digital signature associated with said boot component stored in a trusted memory location.

7. The method of claim 4, wherein step (4) employs a secure protocol to obtain a replacement boot component from a trusted repository to replace said failed boot component.

* * * * *

UNITED STATES PATENT AND TRADEMARK OFFICE
CERTIFICATE OF CORRECTION

PATENT NO. : 6,185,678 B1  Page 1 of 1
APPLICATION NO. : 09/165316
DATED : February 6, 2001
INVENTOR(S) : William A. Arbaugh et al.

It is certified that error appears in the above-identified patent and that said Letters Patent is hereby corrected as shown below:

Column 22, line 24 replace "verifving" with -- verifying --

Column 22, line 26 insert -- component -- after "failed boot"

Signed and Sealed this
Sixth Day of November, 2012

David J. Kappos
*Director of the United States Patent and Trademark Office*